(12) United States Patent
Rinko

(10) Patent No.: US 11,536,896 B2
(45) Date of Patent: Dec. 27, 2022

(54) LIGHT DISTRIBUTION STRUCTURE AND ELEMENT, RELATED METHOD AND USES

(71) Applicant: NITTO DENKO CORPORATION, Osaka (JP)

(72) Inventor: Kari Rinko, Helsinki (FI)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/760,259

(22) PCT Filed: Nov. 1, 2018

(86) PCT No.: PCT/IB2018/058575
§ 371 (c)(1),
(2) Date: Apr. 29, 2020

(87) PCT Pub. No.: WO2019/087118
PCT Pub. Date: May 9, 2019

(65) Prior Publication Data
US 2020/0257044 A1    Aug. 13, 2020

Related U.S. Application Data

(60) Provisional application No. 62/646,461, filed on Mar. 22, 2018, provisional application No. 62/580,153, filed on Nov. 1, 2017.

(51) Int. Cl.
*G02B 6/12* (2006.01)
*F21V 8/00* (2006.01)
*G02B 6/02* (2006.01)

(52) U.S. Cl.
CPC ....... *G02B 6/12002* (2013.01); *G02B 6/0038* (2013.01); *G02B 6/0065* (2013.01); *G02B 6/02038* (2013.01); *G02B 6/02052* (2013.01)

(58) Field of Classification Search
CPC ...... G02B 6/12; G02B 6/0038; G02B 6/0065; G02B 6/02
See application file for complete search history.

(56) References Cited

U.S. PATENT DOCUMENTS

| 5,396,350 A | 3/1995 | Beeson et al. |
| 6,846,089 B2 | 1/2005 | Stevenson et al. |

(Continued)

FOREIGN PATENT DOCUMENTS

| CN | 102947090 A | 2/2013 |
| CN | 104950511 A | 9/2015 |

(Continued)

OTHER PUBLICATIONS

International Search Report, dated Dec. 18, 2018 by the Japan Patent Office, in International Application No. PCT/IB2018/058575.

(Continued)

*Primary Examiner* — Tina M Wong
(74) *Attorney, Agent, or Firm* — Greenblum & Bernstein, P.L.C.

(57) ABSTRACT

A light distribution structure 10 and a related element 100, such as a light guide, are provided. The structure 10 is preferably an optically functional layer comprising an at least one feature pattern 11, 11A established in a light-transmitting carrier by a plurality of three-dimensional optical features variable in terms of at least one of the cross-sectional profile, dimensions, periodicity, orientation and disposition thereof within the feature pattern. In some instances, the optical features are embodied as internal optical cavities 12 capable to establish the total internal reflection (TIR) function at a horizontal surface and at an essentially vertical surface thereof. A method for manufacturing the light distribution structure is further provided.

28 Claims, 20 Drawing Sheets

(56) References Cited

U.S. PATENT DOCUMENTS

| | | | |
|---|---|---|---|
| 9,791,603 B2 | 10/2017 | Edmonds et al. | |
| 11,391,880 B2* | 7/2022 | Rinko | G02B 6/0023 |
| 2004/0228112 A1 | 11/2004 | Takata | |
| 2007/0279727 A1 | 12/2007 | Gandhi et al. | |
| 2008/0186736 A1 | 8/2008 | Rinko | |
| 2008/0196607 A1 | 8/2008 | Rinko | |
| 2008/0267572 A1 | 10/2008 | Sampsell et al. | |
| 2009/0086466 A1 | 4/2009 | Sugita et al. | |
| 2011/0244187 A1 | 10/2011 | Rinko | |
| 2011/0296726 A1 | 12/2011 | Rinko | |
| 2013/0314943 A1 | 11/2013 | Huang | |
| 2013/0315534 A1 | 11/2013 | Huang et al. | |
| 2014/0140091 A1 | 5/2014 | Vasylyev | |
| 2015/0253487 A1* | 9/2015 | Nichol | G02B 6/0036 362/610 |
| 2016/0042913 A1 | 2/2016 | Adibi et al. | |
| 2016/0313491 A1* | 10/2016 | Li | G02B 6/0026 |
| 2017/0212295 A1 | 7/2017 | Vasylyev | |
| 2018/0231712 A1* | 8/2018 | Pare | G01J 3/0218 |
| 2020/0257044 A1* | 8/2020 | Rinko | G02B 6/0038 |
| 2021/0181399 A1* | 6/2021 | Rinko | G02B 6/006 |

FOREIGN PATENT DOCUMENTS

| | | |
|---|---|---|
| EP | 1 988 333 A1 | 11/2008 |
| JP | 2002-358811 A | 12/2002 |
| JP | 2009-540503 A | 11/2009 |
| TW | 201606921 A | 2/2016 |

OTHER PUBLICATIONS

Written Opinion of the International Searching Authority, dated Dec. 18, 2018 by the Japan Patent Office, in International Application No. PCT/IB2018/058575.

Extended European Search Report (published in the English Language), dated Jul. 6, 2021 by the European Patent Office (EPO), for European Patent Application No. 18874472.6.

Notice of Reasons for Refusal (including English Language Translation), dated May 24, 2022, by the Japan Patent Office (JPO), in Japanese Patent Application No. 2020-543427.

First Office Action and Search Report (including English Language Translation), dated Mar. 3, 2022, by the China National Intellectual Property Administration of the People's Republic of China, for Chinese Patent Application No. 201880070904.8.

European Office Action, dated Jul. 8, 2022, for the corresponding European Patent Application No. 18 874 472.6.

Taiwanese Office Action and Search Report (including English Language Translations), dated May 31, 2022, in the corresponding Taiwanese Patent Application No. 107138814.

* cited by examiner

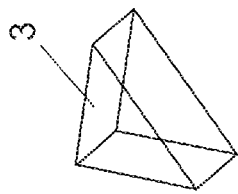
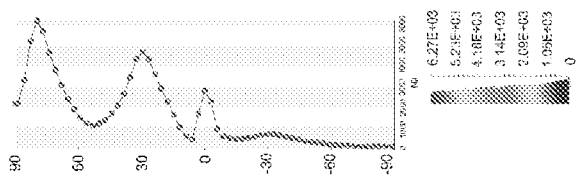
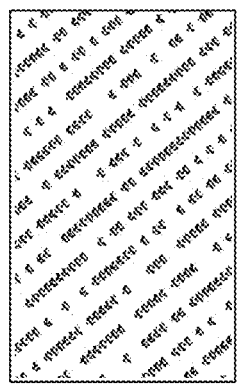
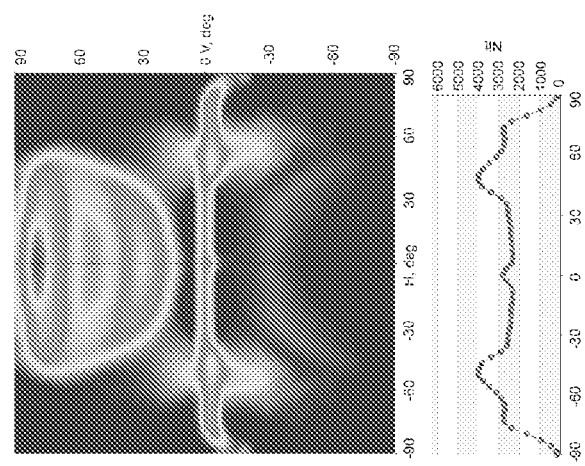
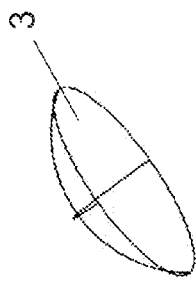
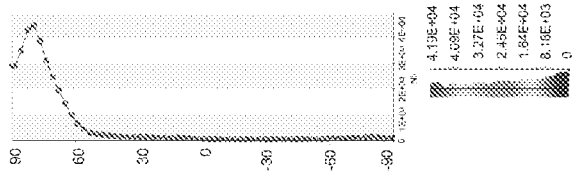
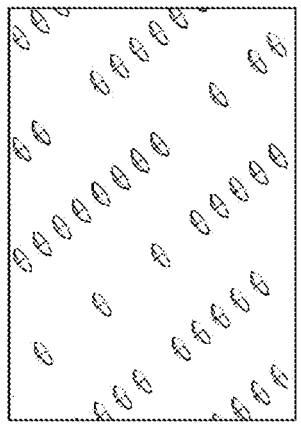
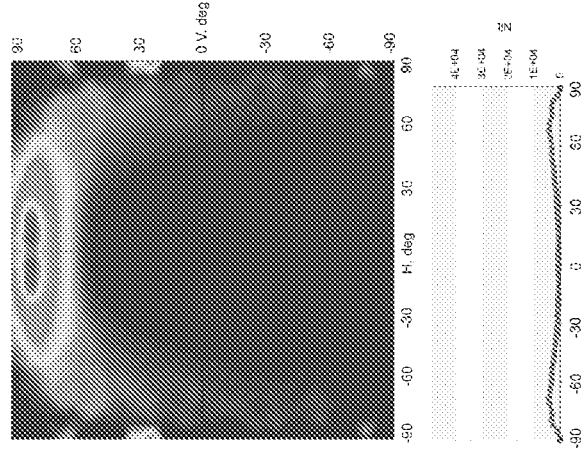
Figure 1B  PRIOR ART

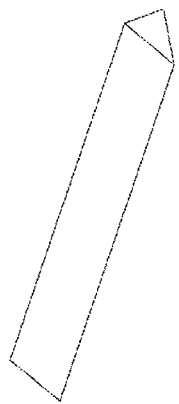
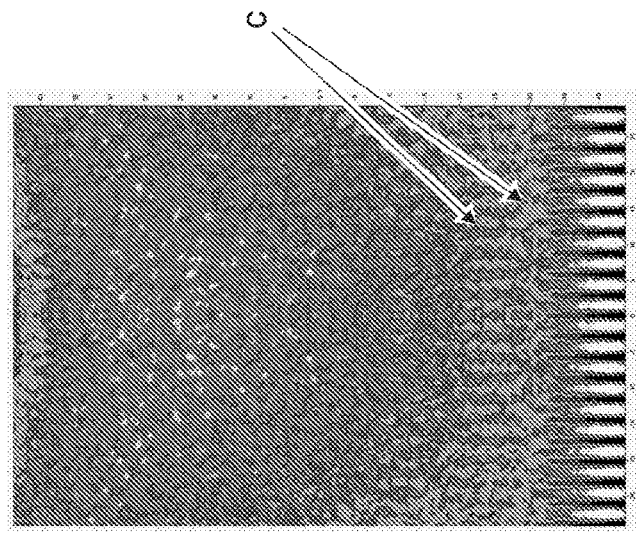
PRIOR ART
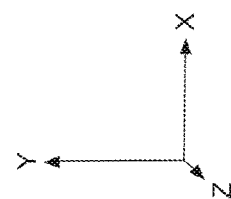
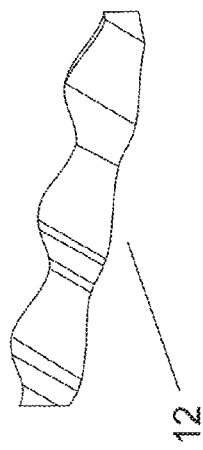
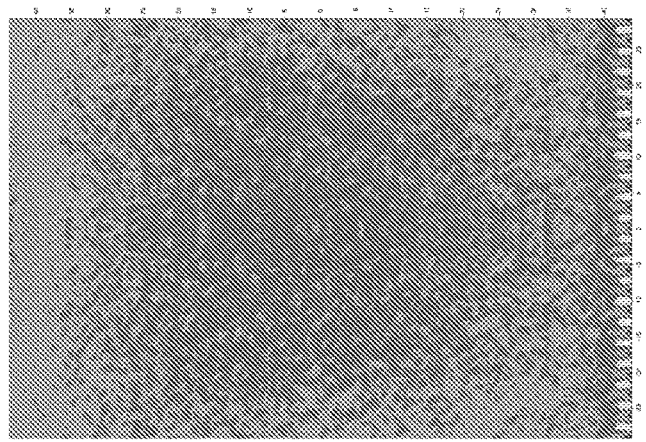
Figure 4B

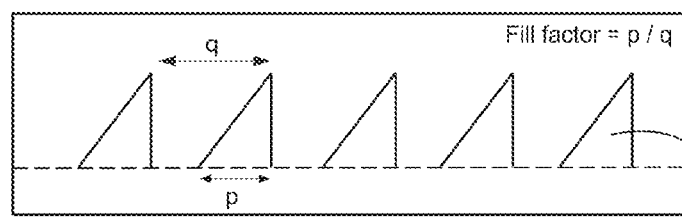
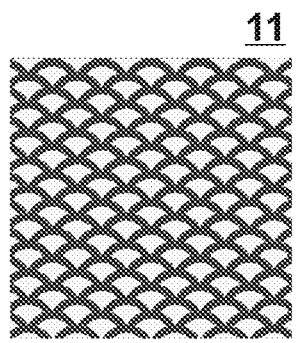
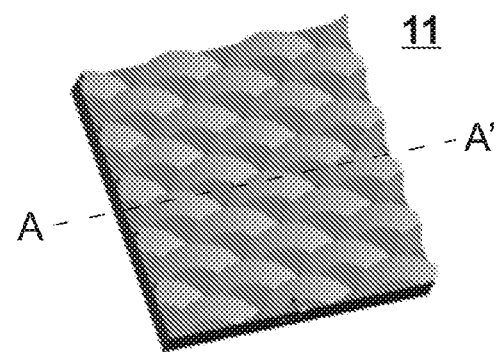
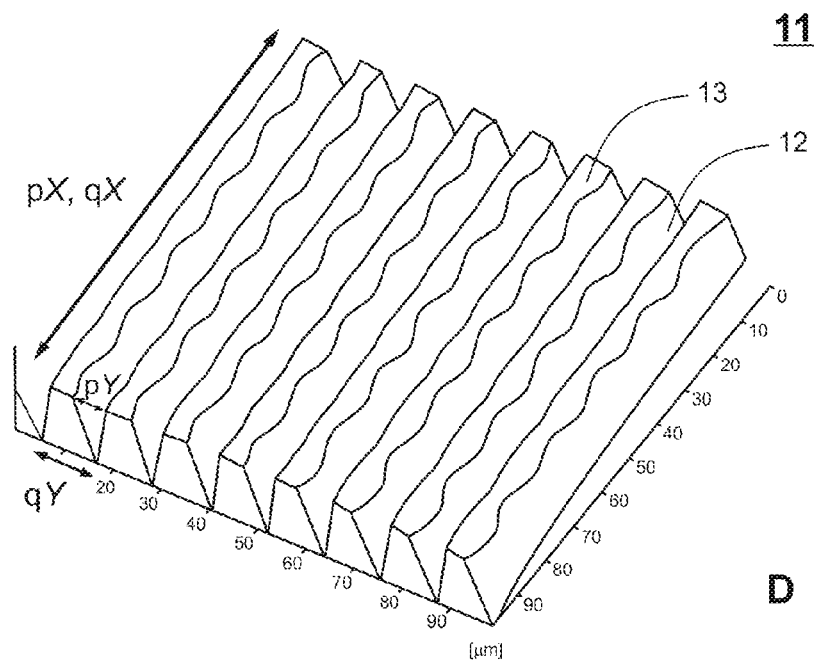
Figure 7

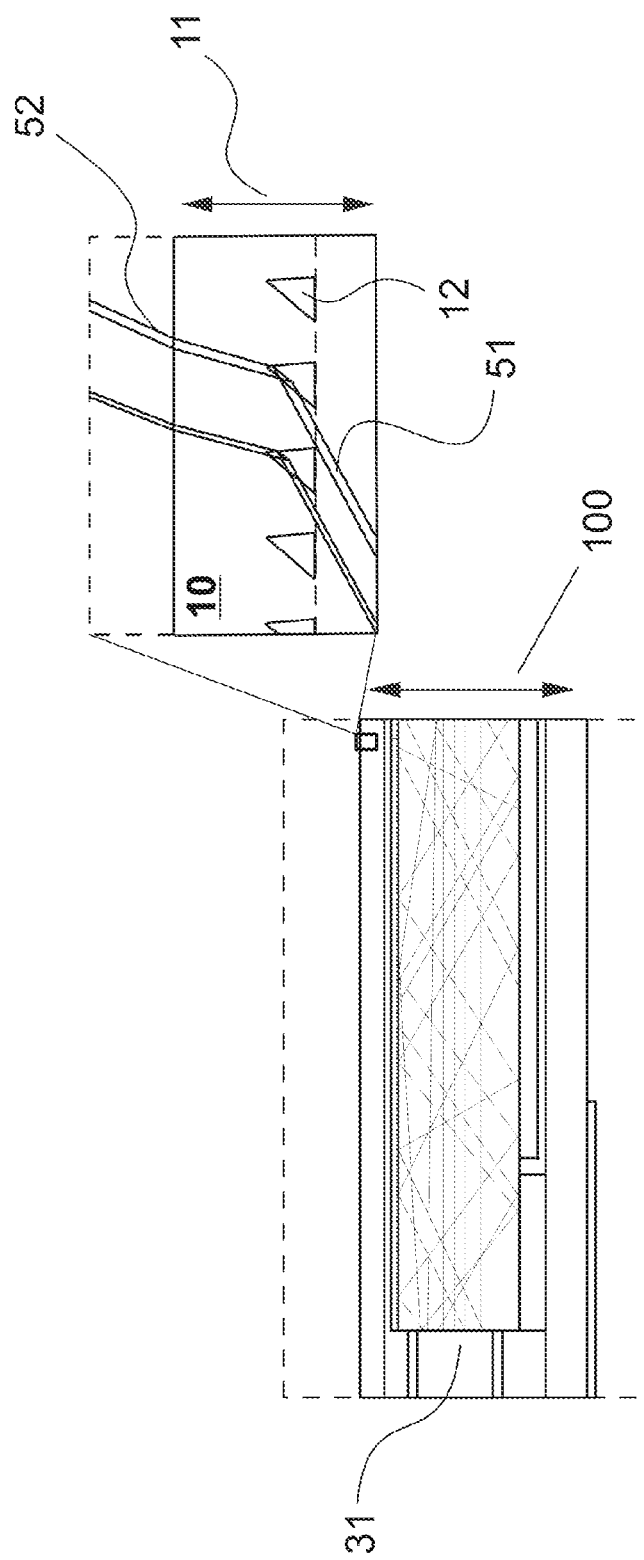

LIGHT DISTRIBUTION STRUCTURE AND ELEMENT, RELATED METHOD AND USES

FIELD OF THE INVENTION

Generally the present invention pertains to light-transmissive substrate optics. In particular, the present invention concerns a light extraction and distribution layer structure for a light distribution element, such as a lightguide, that provides for markedly enhanced illumination performance.

BACKGROUND

In lightning applications, illumination performance largely depends on a light distribution system utilized. Typical lightguide (LG) systems include optical patterns that control light outcoupling efficiency upon light extraction. In order to control an emitted light angle distribution and to achieve a desired performance, conventional lightguide solutions designed for illumination/lightning applications still utilize a number of separate optical films, such as brightness enhancement films (BEFs), for example. Thus, from FIG. 1B one may observe that by conventional lightguide solutions (hereby, the most typical solutions based on microlens- and V-groove shaped optical patterns) implemented without BEFs, controlling light distribution a desired manner is not possible. However, with the multilayered solutions (with several structurally distinct layers) it is impossible to achieve full lamination and transparency, and it is further impossible to produce thin and bendable lightguides, as well as to make asymmetric profile distribution within a lightguide. In addition, several separate layers have reduced efficiency in comparison to a single layer. The latter is especially evident when light is recycled within the light distribution system, such as for polarizing purposes, for example.

The U.S. Pat. Nos. 6,846,089 and 9,791,603 disclose multilayer film stack solutions for light distribution control. These solutions do not exploit light (internally) incident within a lightguide medium and thus fail providing a function of light extraction from the lightguide medium.

The U.S. Pat. No. 6,846,089 thus discloses an optical structure comprising a number of prismatic transmissive films, such as BEFs, bonded together and a bonding method. Mentioned films are transmissive type optical components that manage light distribution angles and redirect light generated by the lightguide. These films utilize light directed out of the lightguide (i.e. outcoupled or extracted light), which typically has to be uniform and light streak-free. However, in order to achieve two-dimensional light distribution control, the film stack disclosed requires provision of at least two different prismatic sheets. Additionally, bonding films together with adhesive(s) reduces optical performance and efficiency. Moreover, the method does not allow for direct optical bonding with the LG medium, since otherwise this would totally ruin the lightguide performance.

The U.S. Pat. No. 9,791,603 discloses, in turn, an improved transmissive prismatic film bonding solution configured to minimize decreased light directing performance and improve mechanical strength. The basic function of said prismatic film stack is comparable to the one disclosed in the previous patent. This film stack utilizes light exiting the lightguide, which light is extracted (out-coupled) and directed out of the lightguide by conventional pattern profiles. Then the multilayer stack is only (re)directing light.

Single-layer LG solutions with linear optical feature patterns are known. For such solutions, two fundamental problems exist when using multiple point light sources, such as LEDs. Typically, multiple point light sources cause visible light streaks starting from a vicinity of the lightguide leading edge until the middle of the lightguide. Another fundamental issue is an extremely wide light extraction distribution in transverse direction (i.e. it is impossible to control directions of the outcoupled/extracted light). Wide angular extraction distribution typically pertains to a fact that conventional LEDs provide for Lambertian distribution of radiant intensity.

FIG. 1A shows a conventional lightguide 1 solution implemented within a concept of bonded optics that generally aims at creating optical functionality within a three-dimensional (3D) system. The lightguide 1 comprises a light-transmitting substrate 1A with a light distribution film 2 on its top surface, which top film comprises a plurality of linear pattern features, such as prominent profiles 3 alternating with grooves 3A. Light rays from a light source 31 are indicated by arrows. The solution shown on FIG. 1 is not fully embedded. From a luminance distribution chart one may observe, at "a", that extracted light has wide angular distribution in transverse direction and, at "b", that light leakage (so called stray light) occurs via the top film 2 by light transmission through the pattern profiles 3, 3A (see also top figure, showing light rays transmitted through the features 3, 3A).

Luminance distribution chart clearly indicates that in LGs implemented as 1 or similar thereto, in is impossible to control angular distribution of extracted in transverse direction. Thus, undesired and uncontrolled light leakage (stray light "escaping" from the lightguide in an unintended direction) caused by light transmission and penetration through the optical pattern profile(s) accounts for markedly reduced illumination efficiency.

To alleviate the light streak problem curvature pattern shapes can be utilized for light extraction. Thus, utilizing discrete microlenses (FIG. 1B, left) or radial grooves (not shown) can eliminate light streaks. However, curvature shapes do not solve a problem of controlling transverse extraction distribution. Light is thus extracted at even wider angle as compared to the linear pattern shape. Therefore certain challenges still exist in controlling extracted light distribution in two directions (longitudinal and transverse), when using microlenses and other curvature patterns.

U.S. Pat. No. 5,396,350 thus discloses a multilayered LG solution with linear, discrete (prismatic) pattern features configured for light extraction, wherein layers are adhered to one another. The solution further includes a microlens layer laminated on the top of the lightguide. The pattern features are relatively large and can be considered as bonded optics. Nevertheless, the disclosed solution does not resolve the problem of multiple point source utilization without light streaks. The problem of two-directional extracted light distribution control is not resolved either. Additionally, large extraction features can cause light recycling, which accounts for the undesired light leakage (stray light). In present disclosure, simulation FIGS. 1 and 4B demonstrate this fundamental issue.

In view of lightguide construction issues, another major drawback is associated with an absence of cost-effective production methods and tools for manufacturing the LGs with advanced 3D structures for large surfaces, i.e. for the surfaces equal or superior to about 0.5-1.5 $m^2$ (square meters). Manufacturing lightguides and/or related light distribution structures for such large surface areas is extremely expensive, wherein costs per each master tool (surface coverage about 1.5 $m^2$) is unacceptable. Additionally, the process is challenging in view of fabricating patterns on an entire (lightguide) surface(s) and volume manufacturing by moulding, for example. This harshly limits possibilities for exploiting the most efficient and advanced optics solutions with high optical power and reduced power consumption which could, in overall, bring the illumination solutions onto a new performance level.

Conventional LGs are further impeded by a number of problems arising upon light extraction (outcoupling). Thus, in conventional LGs, when light ray(s) propagating within a light-transmitting medium hit an internal surface of said lightguide at an angle of incidence equal to or greater than the critical angle (relative to the surface normal), a phenomenon of Total Internal Reflection (TIR) occurs. Upon TIR, light does is not refracted out (outcoupled) of said lightguide/light pipe, but instead light is reflected back into the lightguide medium. Such solutions are inefficient in illumination applications.

SUMMARY OF THE INVENTION

An objective of the present invention is to at least alleviate each of the problems arising from the limitations and disadvantages of the related art. The objective is achieved by various embodiments of a light distribution layer structure according what is defined in the independent claim 1.

In an embodiment, a light distribution structure is provided in the form of an optically functional layer comprising an at least one three-dimensional feature pattern established in a light-transmitting carrier medium by a plurality of internal optical cavities, wherein each said optical cavity is configured to establish an at least one optical function at its' horizontal surface and at its' essentially vertical surface, the latter being arranged in a direction of light propagation in the light-transmitting carrier medium, wherein by said horizontal surface the optical cavity is configured to mediate light propagation in the light-transmitting carrier medium along an essentially longitudinal light propagation path, and to further distribute light rays reflected from said horizontal surface, in the light-transmitting carrier medium, towards the essentially vertical surface of the subsequent optical cavity of cavities via a plurality of light passages, and by said essentially vertical surface the optical cavity is configured to extract light out of the structure in a predetermined direction essentially transverse to the longitudinal light propagation path, and wherein said at least one optical function is established by a configuration of the light passage area combined with an at least one of the dimensions, periodicity, orientation and disposition of the optical cavities within the feature pattern.

In an embodiment, said at least one optical function is the total internal reflection (TIR) function.

In an embodiment, each optical cavity is configured to receive and to further distribute light arriving thereto at an angle of incidence equal to or greater than the critical angle relative to the surface normal.

In an embodiment, the established optical cavities are filled with a gaseous material, such as air.

In an embodiment, each individual optical cavity is configured variable in terms of at least one of the cross-sectional profile, dimensions, periodicity, orientation and disposition thereof within the feature pattern.

In an embodiment, the optical cavities are established with the three-dimensional profiles selected from one of the essentially blazed, curved or wave-shaped profiles. In an embodiment, the optical cavities are established with the three-dimensional profiles provided as symmetrical sinusoidal waveforms or asymmetrical sinusoidal waveforms.

The cross-sectional profile variability, curvature angle variability and/or curvature radius variability can be established, for each individual optical cavity, with a predetermined periodicity.

In an embodiment, the at least one feature pattern comprises a plurality of optical cavities with discrete profiles or at least partly continuous profiles.

The cross-sectional variability can be established, for each individual optical cavity, in three dimensions by the at least one of the: curvature angle, curvature radius, length of a pitch, width, height, period, phase, configuration of a light passage area, and the like.

In an embodiment, the feature pattern is configured to extend over the entire optically functional layer. In another embodiment, the light distribution structure comprises a number of feature patterns arranged on an at least one optically functional layer according to a predetermined order. In some embodiments, within the at least one feature pattern, the plurality of optical cavities is arranged into an array or arrays extending along and/or across an entire area occupied by said feature pattern.

The optically functional layer is configured with a fill factor for the feature pattern equal to 100% or less than 100%.

In an embodiment, the light distribution structure comprises at least two optically functional layers with the at least one feature pattern established on each said layer.

The light distribution structure can be provided in the form of a film, a sheet or a coating. It is preferred that the optically functional layer is established in an optical polymer or glass.

The optical cavities can be further formed at an interface with an additional flat, planar carrier layer, selected from a transparent layer, a reflector layer, and/or a coloured layer.

The light distribution structure is preferably configured to receive light from a plurality of point light sources.

In another aspect, a method for manufacturing a light distribution structure is provided, in accordance to what is defined in the independent claim 20, wherein said structure is provided in the form of an optically functional layer comprising an at least one feature pattern established in a light-transmitting carrier by a plurality of three-dimensional optical features variable in terms of at least one of the cross-sectional profile, dimensions, periodicity, orientation and disposition thereof within the feature pattern. The method preferably comprises manufacturing a patterned master tool for said three-dimensional feature pattern by a piezoelectric cutting method selected from a fast tool servo (FTS) method and a stylus engraving method, or by a laser engraving method, and transferring the three-dimensional feature pattern onto the light-transmitting carrier.

The step of manufacturing the patterned master tool preferably comprises provision of the three-dimensional feature pattern configured as symmetrical or asymmetrical sinusoidal waveforms or segmental curvature forms with continuous or discrete profiles. The master tool can be further fabricated in a planar or a cylindrical format.

The step of transferring the three-dimensional feature pattern onto the light-transmitting carrier is preferably implemented by a roll-to-roll method, a roll-to-sheet method or a sheet-to-sheet method.

The method can further comprise a surface polishing treatment.

In still another aspect, a light distribution element is provided, in accordance to what is defined in the independent claim 25. The light distribution element preferably comprises an optically transparent substrate configured to establish a path for light propagation therealong, and an at least one light distribution structure, according to some previous aspect.

In an embodiment, the light distribution element comprises the light distribution structure in the form of an additional layer, such as a film, a sheet or a coating, disposed on an at least one surface of the optically transparent substrate. In another embodiment, the light distribution element comprises the light distribution structure fully integrated and/or embedded into the optically transparent substrate.

In some embodiments, the light distribution element is configured as a lightguide, a light pipe, a lightguide film or a lightguide plate.

The light distribution element can further comprise an at least one light source, selected from: a Light Emitting Diode (LED), an Organic Light Emitting Diode (OLED), a laser diode, a LED bar, an OLED strip, a microchip LED strip, and a cold cathode tube.

In further aspect, use of the light distribution element according to some previous aspect is provided in illumination and indication.

Said use is provided in illumination of wall- and roof panels, in window and façade illumination, in signage illumination, in greenhouse illumination, in display illumination, in passive matrix illumination, in signal illumination, in touch signal solutions, in security systems, in producing light-directing films, in creating light masks for a non-transparent mode, in security systems, in indicator devices, in reflectors, and/or in light collector solutions.

In still further aspect, a roll of a light distribution element is provided. In an embodiment, the roll comprises an optically functional layer comprising an at least one feature pattern established in a light-transmitting carrier by a plurality of three-dimensional optical features variable in terms of at least one of the cross-sectional profile, dimensions, periodicity, orientation and disposition thereof within the feature pattern, and a light filter layer formed of a substrate material having a refractive lower than the refractive index of the carrier medium constituting the optically functional layer, and comprising a plurality of apertures.

In some embodiments, the optically functional layer in said roll is established by the light distribution structure, according to some previous aspect.

The utility of the present invention arises from a variety of reasons depending on each particular embodiment thereof. At first, the invention pertains to a novel light extraction pattern solution comprising a single layer 3D feature pattern optimized for enabling the extracted light distribution control essentially along a light propagation path (lengthwise) and, at the same time, in a direction essentially transverse to the light propagation path, with respect to a direction of light propagation from a luminaire (on-axis illumination or collimated illumination).

By optimizing parameters of the 3D pattern profile features, such as dimensions (length, width and height), period, curvature radius and/or curvature angles, it is possible to efficiently control extraction and distribution of light incident onto said feature pattern profile at a range of angles (e.g. conical light angle distribution) by total internal reflection (TIR). By thorough pattern profile optimization, the solution allows for maximizing light refraction by total internal reflection for a preferred distribution angle. Light transmission via the pattern is minimized by dedicated profile design.

In some preferred embodiments, the solution provided hereby is advantageously realized as integrated (internal) cavity optics. In conventional solutions that involve optical cavities light is often transmitted (penetrated) into said cavities, whereby undesired refraction is caused and light distribution control is not achievable. On the contrary, in the solution presented hereby extracted light distribution (in terms of refraction angle and directions, accordingly) can be controlled with high precision by TIR functionality of the associated optically functional feature pattern.

In order to achieve (extracted) light distribution at desired angles of reflection mediated by TIR, a genuine 3D feature pattern profile is required, due to a fact that light is normally incident on the feature pattern/profiles at a variety of angles (such as in case of conical light angle distribution). By conventional light distribution solutions, optimal TIR conditions cannot be achieved due to certain challenges in manufacturing light extraction and distribution structures. The latter should be designed in consideration of different extraction angles based on TIR, as there could be more than one TIR points for an individual light beam.

The invention further allows for production of a (single) light distribution system, such as lightguides, lightguide plates, etc., in a markedly more efficient and affordable, in terms of cost effectiveness, manner, as the solution provided hereby does not require mastering of expensive multiple structure layers. The present solution allows for manufacturing large surface area lightguide structures, with surface area coverage ranging from about 0.5 m$^2$ up to several square meters (about 1-10 m$^2$).

The solution further provides for increased optical performance efficiency, since exploitation thereof requires no other discrete optical structures or films.

The light distribution structure provided hereby can be utilized to establish an extracting (outcoupling) pattern film for a non-transparent lightguide (with a higher fill factor) and for a transparent lightguide (with a lower fill factor).

Additionally, production of light distribution elements, such as lightguides, lightguide plates, etc., according to some embodiments for the present invention, constitutes a much more efficient and affordable, in terms of cost-effectiveness, solution, as it does not require mastering of expensive multiple structures. The solution allows for manufacturing large surface area lightguide structures, with surface area coverage ranging from about 0.5 m$^2$ up to several square meters (about 1-10 m$^2$).

The solution further provides for increased optical performance efficiency, since exploitation thereof does not require additional optical structures or films.

A light distribution structure, according to some embodiments, further comprises an optical filter layer that has low refractive index value and comprises apertures for light passing therethrough, thus enabling more uniform light distribution in the lightguide structure.

The terms "optical" and "light" are largely utilized as synonyms unless explicitly stated otherwise and refer to electromagnetic radiation within a certain portion of the electromagnetic spectrum, preferably, but not limited to, visible light.

In its broadest sense, the term "optical filter" or a "light filter" refers, in the present disclosure, to a device or a material used to change the spectral intensity distribution or the state of polarization of electromagnetic radiation incident thereupon. The filter may be involved in performing a variety of optical functions, selected from: transmission, reflection, absorption, refraction, interference, diffraction, scattering and polarization.

In its broadest sense, the term "lightguide" or "waveguide") refers, in the present disclosure, to a device or a structure configured to transmit light therealong (e.g. from a light source to a light extraction surface). The definition involves any type of the lightguide, including, but not limited to a light pipe type component, a lightguide plate, a lightguide panel, and the like.

The term "carrier" or "carrier medium" generally refers to a flat, planar member composed of a substrate material configured for light propagation and optionally constituting a layered structure.

The expression "a number of" refers herein to any positive integer starting from one (1), e.g. to one, two, or three; whereas the expression "a plurality of" refers herein to any positive integer starting from two (2), e.g. to two, three, or four.

The terms "first" and "second" are not intended to denote any order, quantity, or importance, but rather are used to merely distinguish one element from another.

BRIEF DESCRIPTION OF THE DRAWINGS

Different embodiments of the present invention will become apparent by consideration of the detailed description and accompanying drawings, wherein:

FIG. 1B shows conventional lightguide solutions implemented without brightness enhancing films (BEF), such as microlens- (left) and V-grooves (right), and luminance distribution charts obtained thereby.

FIGS. 4A and 4B demonstrate performance comparison between an optical pattern established in the light distribution structures 10, according to some embodiments, and an optical pattern in conventional lightguides.

FIGS. 7A-7D describes a concept of the fill factor.

FIG. 12 is a cross-sectional view of a light distribution element 100, such as a lightguide, comprising the light distribution structure 10, according to some embodiment.

DETAILED DESCRIPTION OF THE EMBODIMENTS

Figure 1A:
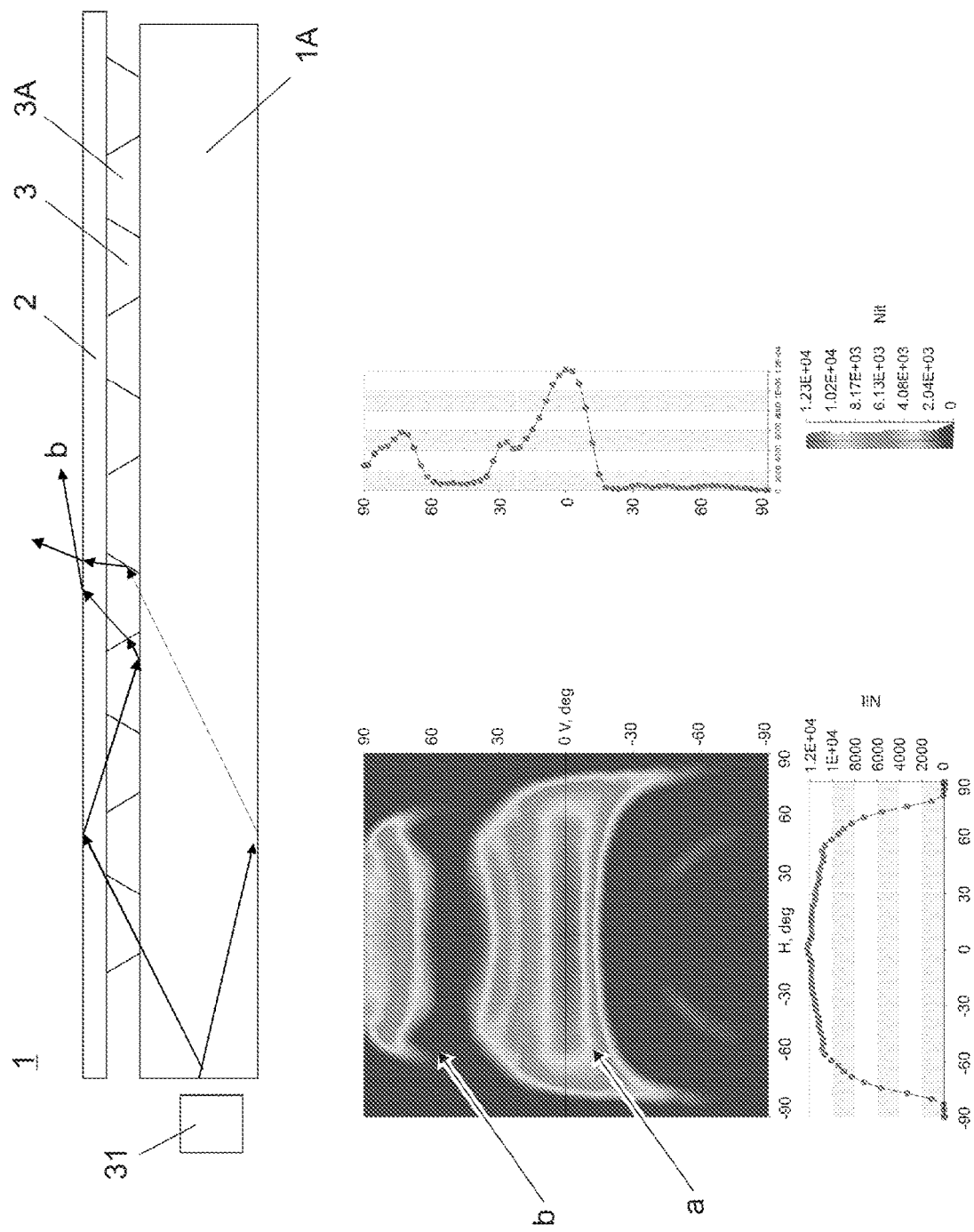
FIG. 1A is a cross-sectional view of a conventional lightguide solution (top) and a luminance distribution chart obtained thereby (bottom).

Detailed embodiments of the present invention are disclosed herein with the reference to accompanying drawings. The same reference characters are used throughout the drawings to refer to same members. Following citations are used for the members:

1, 1A, 2, 3, 3A—a conventional light guide and components thereof;
10—a light distribution layer structure;
11, 11A—optical feature patterns;
111, 111A—light-transmitting carrier medium;
12—optical (pattern) features;
13—light passages;
121, 122—optically functional surfaces;
100, 100A—a light distribution element (a lightguide);
101, 101A—an optically transparent substrate;
141—an optical filter surface or a layer;
141A—apertures provided in the optical filter surface;
151—an adhesive;
31—a light source;
41—Bright Enhancement Films, BEFs (prior art);
42—a reflector film;
51, 52—incident light and extracted (out-coupled) light, accordingly;
71—a laser or a scanner.

Figure 2A:
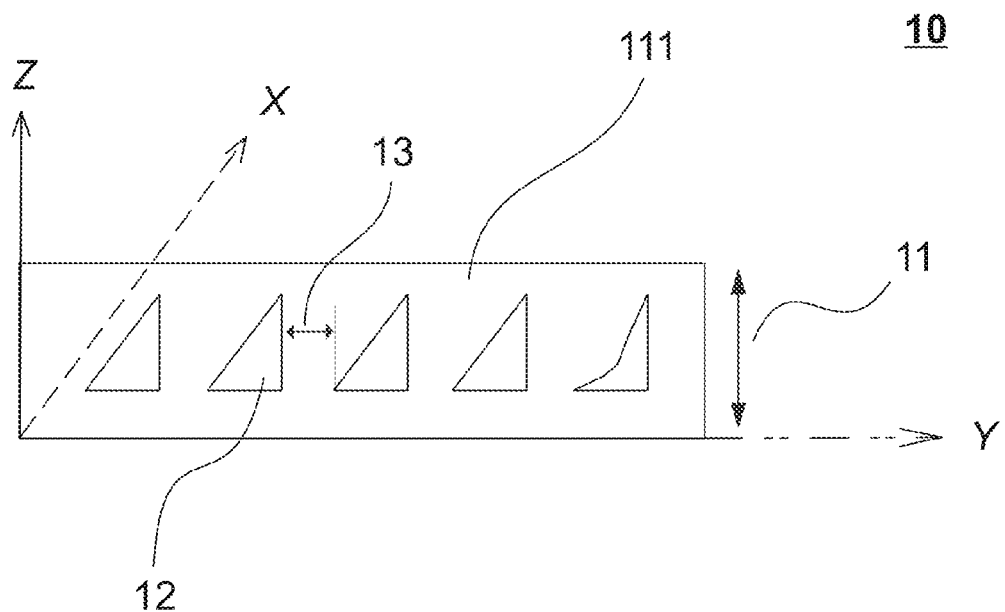
FIGS. 2A and 2B are cross-sectional views of a light distribution layer structure 10, according to some embodiments.
Figure 2B:
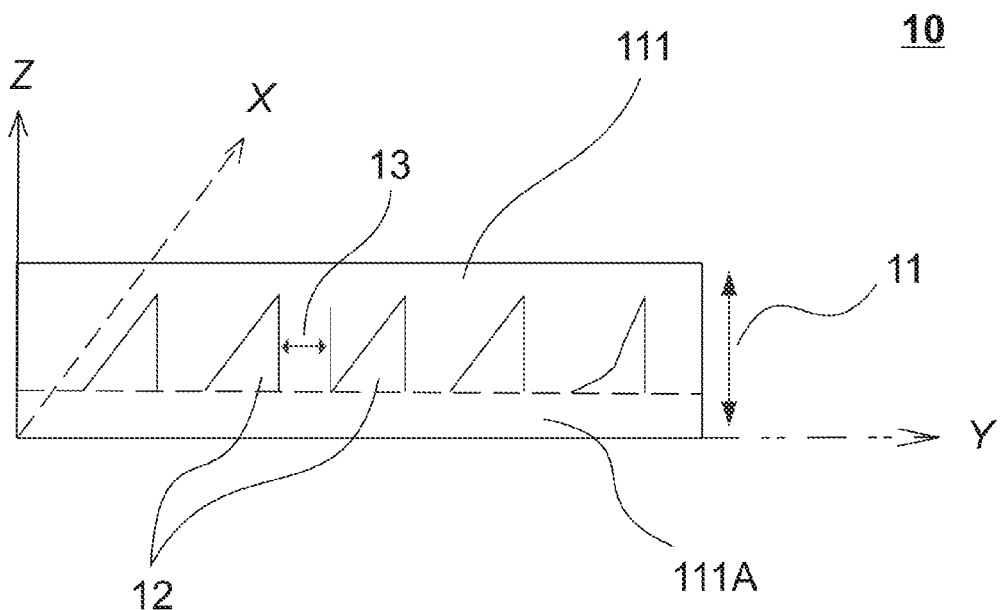

FIGS. 2A and 2B are cross-sectional views of a light distribution structure 10, according to some preferred embodiment. FIG. 2A thus shows the structure 10, configured in the form of an optically functional layer, comprising an at least one three-dimensional feature pattern 11 established in a light-transmitting carrier medium 111 by a plurality of internal optical features. In preferred embodiments, the feature pattern 11 is established by a plurality of internal optical cavities (viz. internal, embedded or integrated cavity optics). The latter are further referred to as "cavities" or "cavity profiles".

Is some embodiments, the light-transmitting carrier medium 111 is an optical polymer or glass. In exemplary embodiments, the carrier medium 111 is polymethyl methacrylate (PMMA).

FIG. 2B shows formation of the structure 10, whereupon an additional light-transmitting carrier medium layer 111A, provided as an entirely flat, planar layer, is arranged against the (patterned) layer 111 such, that the internal (viz. embedded or integrated) feature pattern 11 is established at an interface between a patterned layer 111 and a planar layer 111A. The boundary between the carrier layers 111, 111A is shown by a dashed line to emphasize an essentially "one-piece" nature of the complete structure 10. The complete structure 10 is provided as a single layer.

In some embodiments, the light distribution structure 10 is provided in the form of a film, a sheet or a coating for an exemplary waveguide.

Primary optical function(s) of the structure 10 include (in)coupling of light propagated in the light-transmitting carrier medium 111 in a direction along an essentially longitudinal light propagation path (indicated by Y axis on FIGS. 2A, 2B, 3) and extraction (out-coupling) of light in a predetermined direction essentially transverse to the longitudinal light propagation path. Transverse direction is indicated by X axis on FIGS. 2A, 2B, 3. The axis Y further indicates the direction of light propagation emitted from a luminaire 31 along an exemplary waveguide (not shown) and it essentially corresponds to a longitudinal axis of said waveguide. The axis X contained in a cross-sectional plane essentially perpendicular to said longitudinal axis Y is referred to as the transverse direction. Surface normal is, in turn, indicated by Z axis. Light propagation related axes X,Y,Z are shown in three-dimensional Cartesian system of coordinates.

Said primary optical function(s) is/are mediated by optical features, preferably configured as internal optical cavities 12. Each cavity 12 thus constitutes a profile comprising a first optically functional surface and a second optically functional surface established at a boundary interface between the light-transmitting carrier medium 111 and an interior of the cavity 12. The first optically functional surface is an essentially horizontal surface 121 (the surface lying essentially in parallel with the (longitudinal) light propagation path in the light-transmitting carrier medium), and the second optically functional surface is an essentially vertical surface 122 arranged in a direction of light propagation in the light-transmitting carrier medium. Said surface 122 faces light rays conveyed from the light source 31 along the carrier medium (in a longitudinal direction).

At said surfaces 121 and 122 the individual cavity 12 is configured to establish an at least one optical function related to conveying and distribution of light in the carrier medium 111 in an essentially horizontal direction and to extracting light out of said carrier medium in an essentially vertical direction, whereby high-precision two-dimensional control over the (conveyed and outcoupled) light distribution is attained by the structure 10.

In preferred embodiments, the optical cavities 12 are configured such, as to establish, at the surfaces 121 and 122, the total internal reflection (TIR) function.

Figure 3:
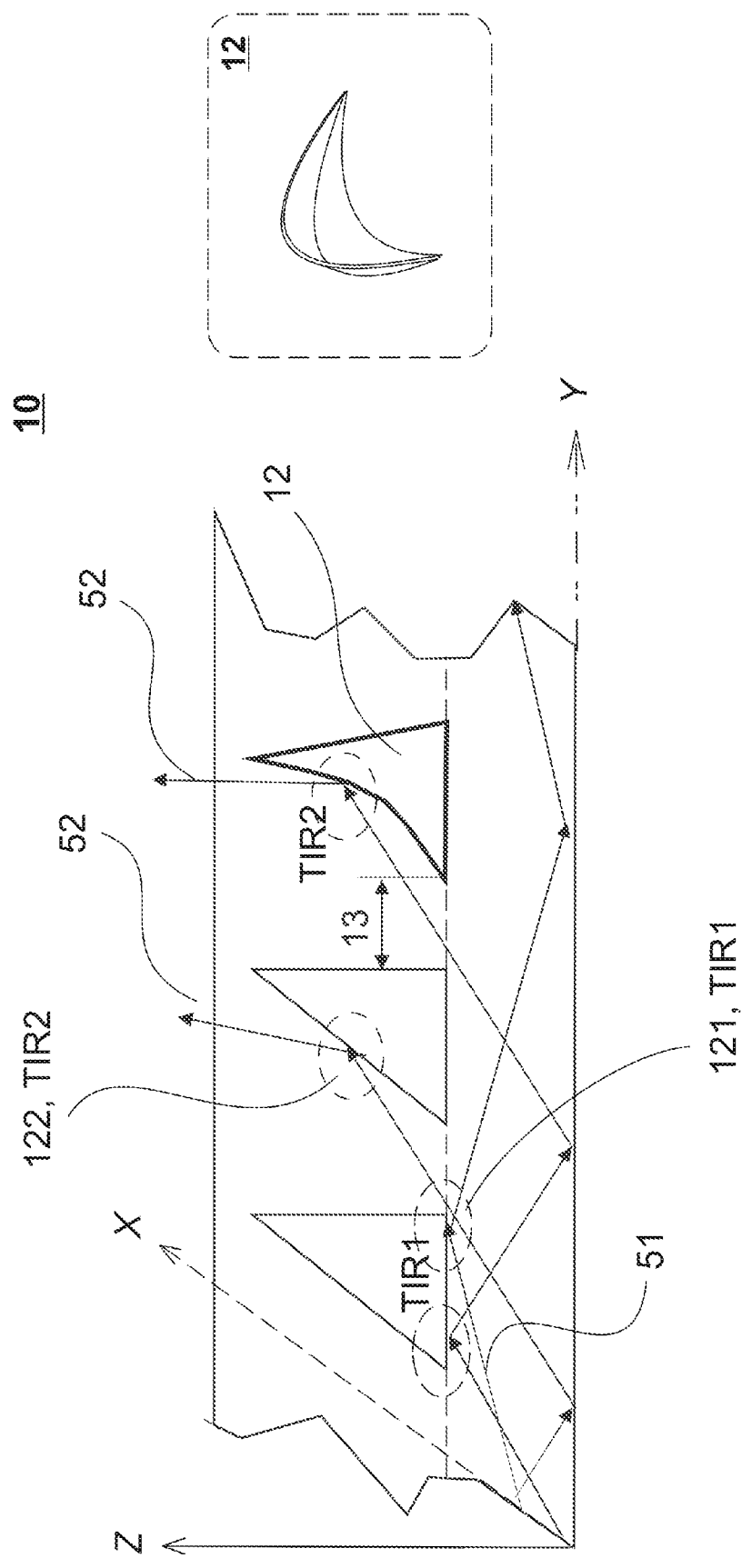
FIG. 3 shows a primary optical function of the light distribution structure 10, according to a preferred embodiment, and an exemplary optical feature of a pattern matrix.

Reference is made to FIG. 3 showing the two-dimensional light distribution control functionality of the light distribution structure 10. From FIG. 3 one may observe that for light rays 51, conveyed in the carrier medium 111 from the light source 31, TIR initially occurs at a lowermost (horizontal) surface 121 of the cavity 12 (TIR1). Light rays reflected (hereby, total internally reflected, TIRed) from the surface 121 are further distributed, in the carrier medium 111, towards the essentially vertical surface 122 of the subsequent optical cavity of cavities 12 via a plurality of light passages 13. Said light passages 13 are light-transmitting carrier medium material 111. The structure 10 is further configured such, as to enable reflection from a bottom surface of the carrier medium 111.

The cavity 12 is further configured such, that TIR function (TIR2) is also established at the second optically functional surface 122 (the essentially vertical surface), whereby light arriving at said surface from the carrier medium 111 is outcoupled and extracted 52 out of the structure 10. As mentioned hereinabove, light 52 is extracted in a predetermined direction essentially transverse to the longitudinal light propagation path. The cavities 12 are configured such, as to enable extraction a controlled distribution angle.

TIR points 1 and 2 are indicated on FIG. 3 by dashed circles.

The first optically functional surface 121 can thus be referred to a surface that controls light propagation in the carrier medium 111 (internal light propagation), whereas the second optically functional surface 122 can be referred to as a light extraction surface.

One example of an individual cavity profile 12 is shown in a dashed box.

The at least one optical function, preferably the TIR function, is established by a configuration of the light passage area 13 combined with an at least one of the dimensions, periodicity, orientation and disposition of the optical cavities (12) within the feature pattern 11. Configuration of the light passage area 13 is an important factor in optimizing directional control over light arriving, via the carrier medium 111, to the second optically functional surface 122.

It should be further emphasized that the surfaces 121 and 122 are configured to total internally reflect light arriving thereat at a range of angles of incidence.

The feature pattern 11 is configured such, as to prevent light penetration inside the cavities 12 and/or transmission of light through said cavities. In all configurations, the cavities are configured to (total internally) reflect light inside the carrier medium (TIR1) and outside the carrier medium (TIR2).

In preferred embodiments, each optical cavity 12 is configured, in view of the surfaces 121, 122, to receive and to further distribute light arriving thereto at an angle of incidence equal to or greater than the critical angle relative to the surface normal (Z).

Critical angle is an incident angle of light relative to the surface normal, at which a phenomenon of the total internal reflection occurs. The angle of incidence becomes a critical angle (i.e. equal to the critical angle), when the angle of refraction constitutes 90 degrees relative to the surface normal. Typically, TIR occurs, when light passes from a medium with high(er) refractive index (Ri) to a medium with low(er) Ri, for example, from plastic (Ri 1.4-1.6) or glass (Ri 1.5) to the air (Ri 1) or to any other media with essentially low refractive indices. For a light ray travelling from the high Ri medium to the low Ri medium, if the angle of incidence (at a glass-air interface, for example) is greater than the critical angle, then the medium boundary acts as a very good mirror and light will be reflected (back to the high Ri medium, such as glass). When TIR occurs, there is no transmission of energy through the boundary. From the other hand, light incident at angle(s) less than the critical angle, will be partly refracted out of the high Ri medium and partly reflected. The reflected vs refracted light ratio largely depends on the angles of incidence and the refraction indices of the media.

It should be noted that critical angle varies with a substrate-air interface (e.g. plastic-air, glass-air, etc.). For example, for most plastics and glass critical angle constitutes about 42 degree. Thus, in an exemplary waveguide, light incident at a boundary between a light-transmitting medium, such as a PMMA sheet, and air at an angle of 45 degree (relative to the surface normal), will be probably reflected back to the lightguide medium, thereby, no light out-coupling will occur.

Light propagation angles in different plastic carrier media are shown in a Table 1 below.

TABLE 1

Light propagation angles in different plastic media.

| Carrier medium material for light propagation | Incident-conical angular distribution inside the medium |
|---|---|
| Transparent polymethyl methacrylate, PMMA | ±42.2° |
| Transparent polycarbonate, PC | ±39.3° |

The feature pattern 11 is thus based on (internal) cavity optics. The optically functional layer provided in the structure 10 thus has an optimized 3D feature pattern profile for light distribution control in essentially horizontal- and vertical directions with the respect to the on-axis illumination or the collimated angle illumination.

By modifying the 3D pattern profile features, such as the cavities 12, and by adjusting said cavity-related parameters, such as dimensions (length, width, height), period, curvature radius and curvature angles, accordingly, extraction of light incident on the lightguide at a variety of angles (e.g. conical angles of the light) is attained by the total internal reflection (TIR). At the same time, light penetration inside the cavities 12 and/or transmission therethrough is prevented.

Referring back to FIG. 3, it is preferred that the feature pattern profile 11 is designed to control light propagation in the carrier medium by cavity surface-mediated TIR and by configuration of the light passage area 13 for light entry onto the light extraction surface 122. By comprehensive design of the passage area 13 (a so called "window", continuous or discrete) indicative of a period distance and the 3D feature (cavity) profile high-precision control over incident light distribution and extraction can be attained. The aforesaid combination allows for setting up an angle or angles, at which the angle of incidence (including that for the conical angle of light) exceeds the critical angle to achieve the most preferred extraction distribution out of the structure 10. The cavity profiles are further designed bearing in mind different extraction angles based on the TIR, as there could be more than one TIR point for the individual light beam.

If light is transmitted/penetrated into the optical cavity (such as in conventional solutions), undesired light refraction occurs, whereby light distribution control is unachievable. The TIR mediated control at horizontal and vertical cavity surfaces, presented hereby, is a key performance feature that allows for achieving the most preferred extracted light distribution.

It is further preferred that the established cavities 12 are filled with air. Nevertheless, any other gaseous medium, as well as any fluid, liquid, gel or solid, can be provided as a filling material for said cavities.

The light distribution structure 10 is advantageously configured such, that profile variability of each individual cavity feature within the optical feature pattern is established in three dimensions by the at least one of the: dimensions (length, width, height), period, length of the pitch/slope, phase curvature radius and curvature angles, configuration of the light passage area, and the like.

Figure 4A:
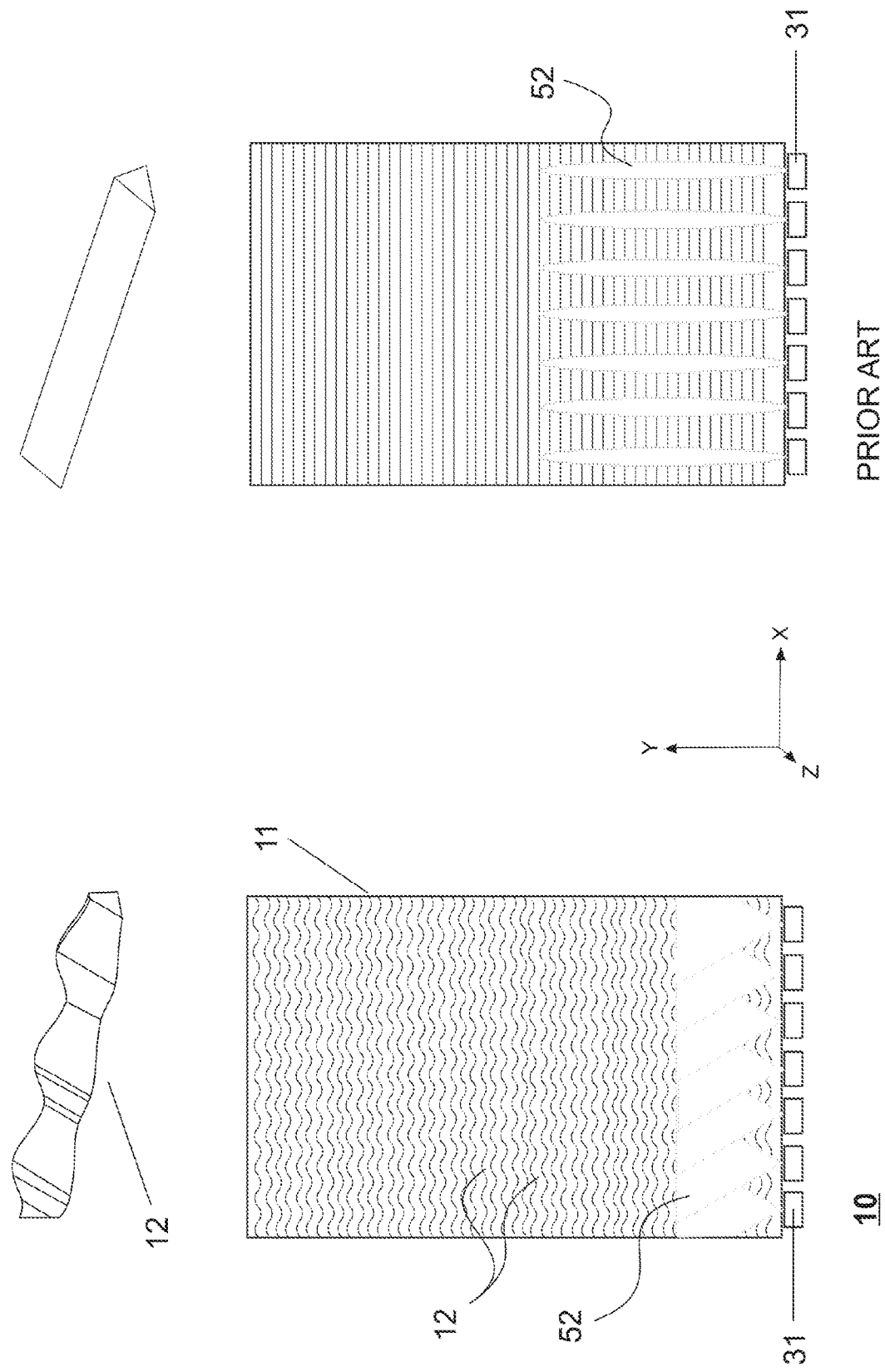

A reference is made to FIGS. 4A and 4B showing a comparison chart between a conventional LED-bar waveguide solution (right) and the same comprising the light distribution structure 10 (left) at a LED-emitted light incoupling edge. Light sources, such as LEDs are indicated by the reference numeral 31. Extracted light distribution characteristics have been compared. The conventional solution comprises a LED-bar with a linear groove (prismatic) pattern. Said prismatic structure has a two-dimensional pattern profile (a triangular profile). From FIGS. 4A, 4B one may observe that conventional solutions produce, in the active illumination area, visible light streaks (extracted light 52 distribution areas at FIG. 4A; and arrows "c" at FIG. 4B) with clear separation areas between said streaks. It is evident that provision of such streaks is highly undesirable in illuminations applications, for example.

The light distribution structure 10 (FIGS. 4A, 4B) comprises, in the configuration discussed, the optical features 12, embodied as cavities, with three-dimensional profiles provided as waveforms, preferably, sinusoidal waveforms. Such structure 10 had demonstrated markedly enhanced, in terms of at least uniformity, extracted light 52 distribution pattern; whereby no visible light streaks in the active illumination areas has been produced.

Importantly, the structure 10 (FIGS. 4A, 4B, right) provides for a high level of uniformity for the extracted light, even with a plurality of point light sources. In some preferred embodiments, the light distribution structure 10 is thus configured to receive light from a plurality of point light sources 31.

In the light distribution structure 10, the optical feature pattern 11 can be configured such, as to extend over the entire optically functional layer. Such continuous structure is shown on FIG. 4A and FIG. 5 (top right and left).

In alternative configurations, the light distribution structure 10, can be configured such, as to include a number of 3D feature patterns 11 arranged on an at least one optically functional layer according to a predetermined order.

It is further preferred that, in the at least one pattern 11, each individual optical cavity 12 is configured variable in at least one of the cross-sectional profile, dimensions, periodicity, orientation and disposition thereof within the optical pattern. For each such cavity 12, variability for at least the cross-sectional profile, the curvature angle and/or the curvature radius variability can be established with a predetermined periodicity or in an entirely random manner (in an absence of periodicity).

Figure 6:
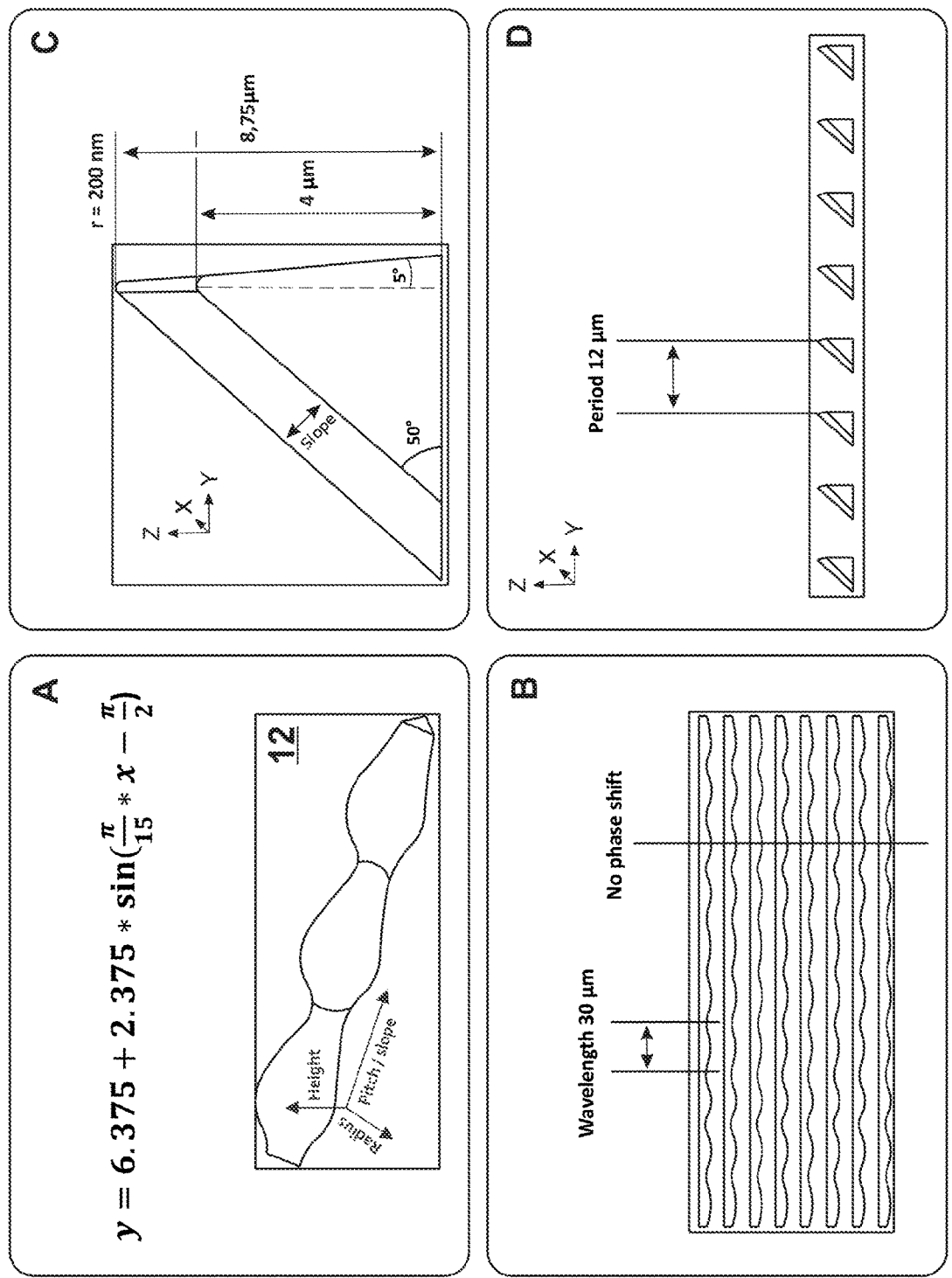
FIG. 6 illustrates an exemplary three-dimensional optical feature 12, according to some embodiments, and an associated cross-sectional profile. (A) 3D shape of an individual optical feature and a general equation. (B) Optical feature pattern, top view. (C) Cross-sectional profile of the feature shown at (A), dimensions indicated. (D) Cross-sectional profile of the feature pattern shown at (B).

Reference is further made to FIG. 6, illustrating an individual optical feature 12 embodied as cavity (A, C) within the optical feature pattern 11 (B, D). The cavity 12 should be considered, in the concept of the present disclosure, as a 3D profile, whose variability is established in said three dimensions optionally with a predetermined periodicity. By the term "periodicity" we refer hereby to a number of cavities 12 per unit length. The term "three-dimensional" is utilized hereby in order to further emphasize that in addition to variable height and width (or radius) of the cavity 12, also the "depth" parameter (front view, chart C) of said cavity profile can be regulated. Thus, the cavity profile 12 can be described as comprising a number of segments, characterized by at least height, pitch (or slope), and width (or radius in case the structure has, at least partly, an essentially radial cross-section; Chart A). Pitch or slope is, in turn, defined as a distance from a point with a greatest width/radius to a point with a smallest width radius (Charts A, C) within an individual cavity 12. Therefore, each said exemplary cavity 12 (FIG. 6) has a profile variable, with a predetermined periodicity, along its entire length.

Optical features, such as cavities 12, are provided within a reference area, such as within the structure 100/the optically functional layer with the pattern 11. Within said reference area, design parameters for said optical features, such as fill factor and/or density, as well as period, pitch, height, length, angle, curvature, local pixel size, position, etc., may vary Fill factor (FF), defined by a percent (%) ratio of the optical features 12 to a unit area, is one of the key parameters in designing optical solutions. FF thus defines a relative portion of the features 12 in the reference area.

Depending on a solution, different methods for determining the portion of the optical features in reference area can be utilized. Simple methods involve defining density of the features 12 per reference area in percent units. Such methods are used in simple designs, such a microlens. Typical microlens is not a periodical structure; instead, microlens can be described as a roundish profile, which can be placed, within a reference area, in an essentially random manner.

More dedicated methods applicable to gratings, periodical structure, local pixels and the like are based on the fill factor calculations (FIG. 7). Said methods involve dividing a predetermined parameter of the individual feature 12 (such as length or width) by a unit of periodicity. Optical features 12 shown on FIG. 7 are embodied as optical cavities. For linear periodical structures the fill factor is calculated, based on the structure cross-section (FIG. 7A), according to what the fill factor is calculated by the equation (1), $$FF = p/q, \quad (1)$$

wherein p represents the width of the cavity 12 and q represent a unit of periodicity, accordingly.

However, the present invention concerns non-linear periodical structures, in which fill factor changes as a function of configuration of the individual features 12 and/or position thereof within the pattern 11. FIG. 7B thus indicates an exemplary feature pattern 11 in accordance to some embodiment viewed from the top. FIG. 7C shows a perspective view of the pattern shown on FIG. 7B, with a crosscut indicated by a line A-A'. From FIG. 7C it can be observed that fill factor value changes along the cross-section A-A' (in transverse direction indicated by X axis) with a predetermined periodicity. Thus, the width p of each individual feature 12 (cavity) is calculated as a function of its cross-section (in a direction of X axis), wherein the fill factor is calculated according to the equation (2):

$$FF = p(X,Y)/q, \quad (2)$$

wherein q represents a unit of periodicity.

In the case of variable period q, the fill factor is calculated as a function of cross-section (cross-sectional location) in two-dimensions, according to the equation (3):

$$FF = p(X,Y)/q(X,Y). \quad (3)$$

Fill factor can thus vary along the X- and/or Y-axes, in accordance with the period, pitch, curvature, location, etc.

Fill factor is thus defined as a ratio (%) of the surface area occupied by the features 12, such as air-cavities, with regard to the reference area. The surface area occupied by the feature 12 is defined in both X- and Y-planes (FIG. 7). For a square sized 100 um, the reference area will constitute 100 um×100 um.

An additional method is based on combined calculation of density and of the fill factor. The method is applicable to discrete pixel structures shown on FIG. 5, for example (bottom, discrete A and B). The method involves determining the fill factor of the optical features 12 within each individual pixel structure 11, thereafter density of said pixel structures per an entire reference area is calculated as a ratio (%) of pixels with regard to said reference area.

In each method, density or fill factor can be constant or variable within a range of 0.1%-100%. On the whole, density or the fill factor within the reference area can periodically vary within the same (repeated) design. Hence, in some configurations, the optically functional layer has an optical feature pattern fill factor equal to or approximately equal to 100%. In some other instances, said fill factor is less than 100%, which allows for controlling haziness and transparency.

In some embodiments, the light distribution structure 10 is further configured to comprise the optical cavities 12 established with the three-dimensional profiles selected from one of the essentially blazed, curved or wave-shaped profiles. In some instances it is preferred that the optical cavities 12 are established with the three-dimensional profiles provided as symmetrical sinusoidal waveforms or asymmetrical sinusoidal waveforms.

In overall, the at least one optical feature pattern 11 can be established by the optical features selected from the group consisting of: a groove, a recess, a dot, and a pixel, wherein said features have crosswise concave or convex profiles selected from: binary, blazed, slanted, prism, trapezoid, hemispherical, microlens and the like, and wherein said structures have lengthwise shape selected from: linear, curved, waved, sinusoid, and the like. Said at least one optical feature pattern 11 can be configured as: a periodical grating structure, micro- and nano-optical profiles, discrete patterns, grating pixel pattern (local periodic), and the like. Pattern period can vary from 0.1 micrometers (µm) up to several centimeters (cm) depending on the application. The optical pattern can further include flat areas for bonding or lamination of additional layers and for cavity formation. Length of the individual (feature) profile within the optical pattern can range from a dot/a pixel up to infinity. In fact, a discrete optical pattern profile can be implemented in any three-dimensional format, in view of specific design and/or provision of the most preferred optical functionality.

Figure 5:
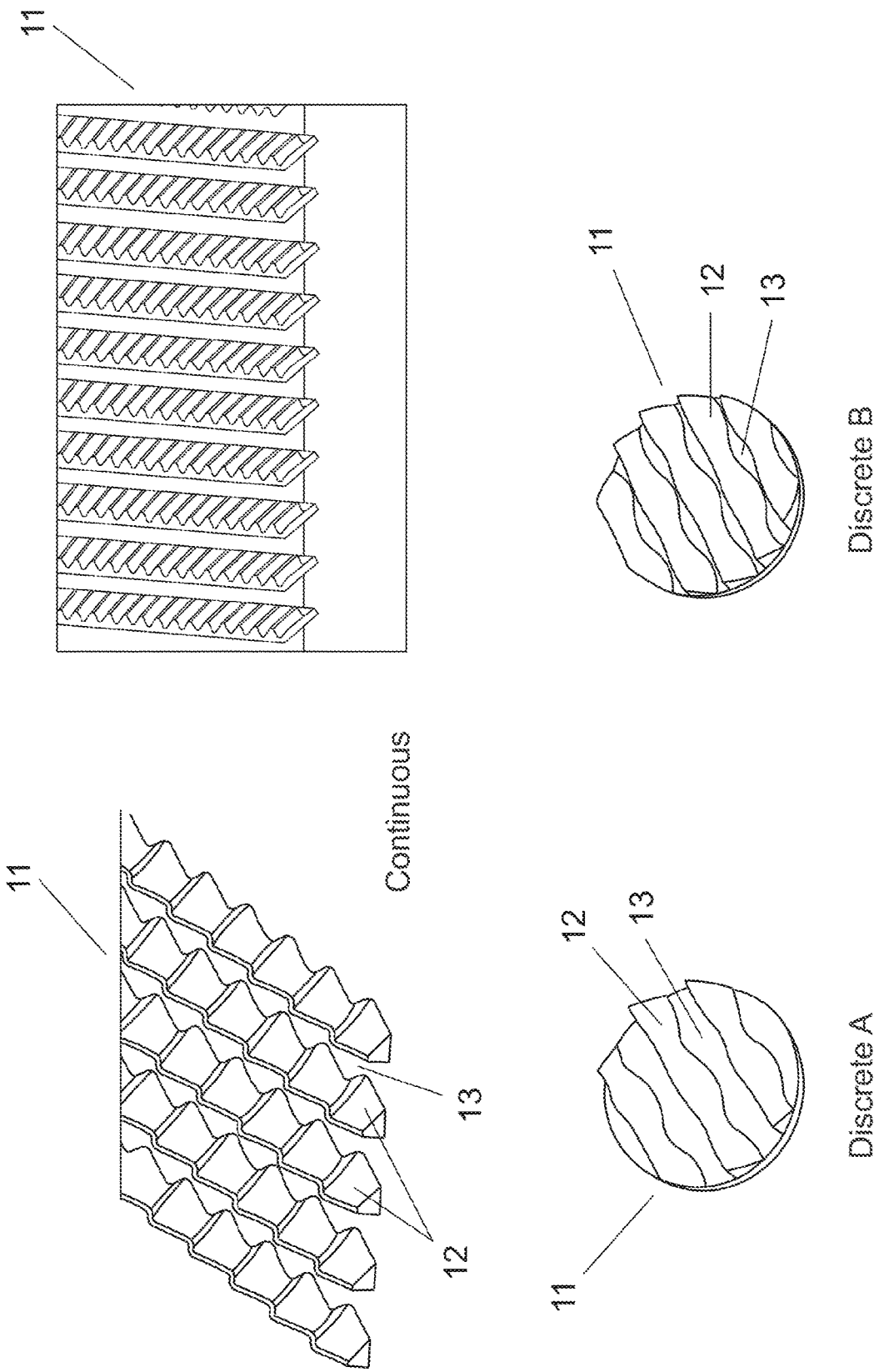
FIG. 5 shows an optical pattern established in the light distribution structure, according to some embodiments, and configured as a discrete pattern (bottom) or as a continuous pattern (top).

The optical feature pattern 11 comprising the above described cavity profiles can be generally referred to as a "hybrid" pattern. Said hybrid pattern can be configured as a discrete pattern (e.g. a pixel, FIG. 5, bottom), or as a continuous pattern (FIG. 5, top). Accordingly, said hybrid pattern can be configured to comprise a plurality of optical features 12 provided as discrete profiles or at least partly continuous profiles. FIG. 5 thus shows continuous- and discrete patterns 11 with optical features 12 and light passage areas 13 formed therebetween.

Figure 8:
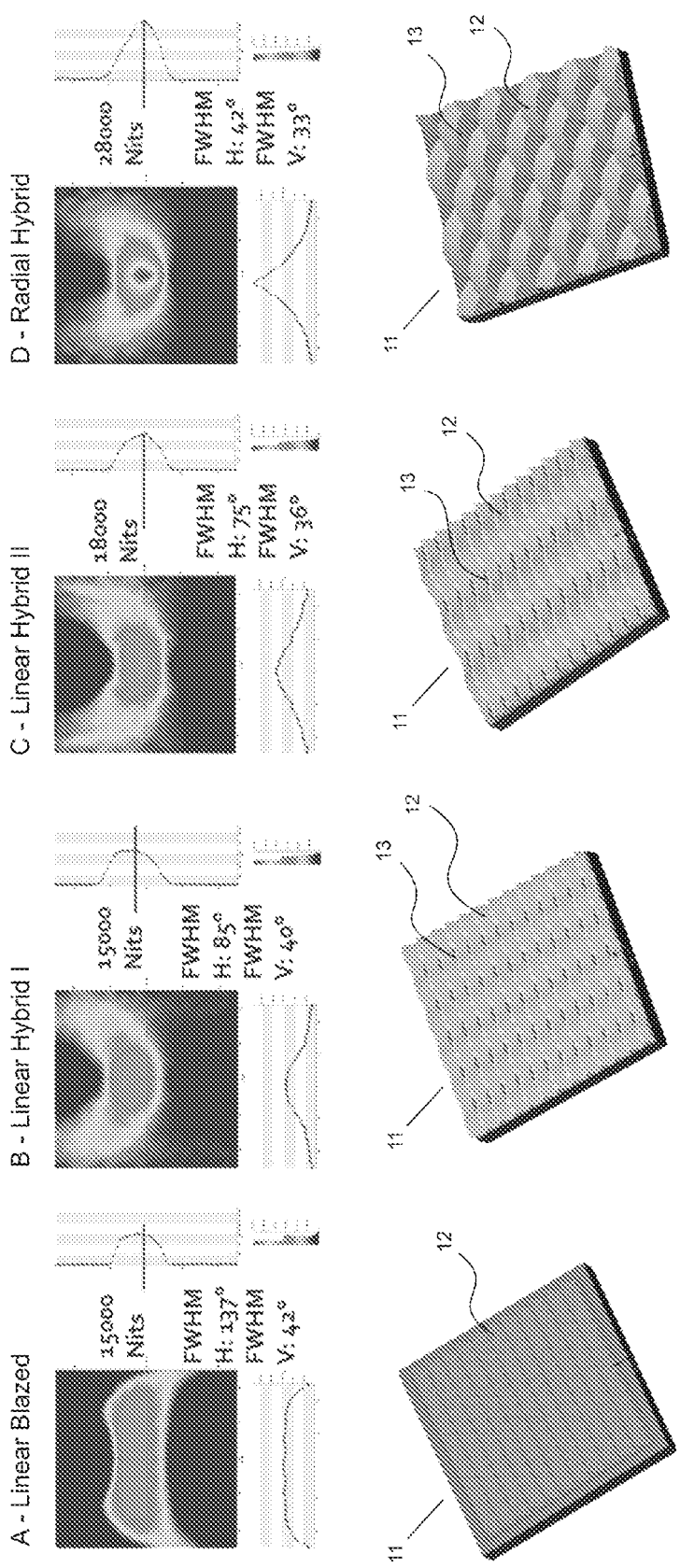
FIGS. 8 and 9 show comparison data for a number of different optical feature pattern 11 solutions, implemented according to some embodiments, in terms of performance control.

In some embodiments, the light distribution structure 10 is further configured such, that within the at least one optical feature pattern, the plurality of optical cavities 12 is arranged into an array or arrays extending along and/or across an entire area occupied by said feature pattern (FIG. 8).

FIG. 8 shows comparison data, in terms of light extraction and distribution performance control for a number of feature pattern solutions, according to different embodiments. The data is shown for the structure 10 with the optical pattern 11 configured as a linear blazed pattern (A), a hybrid pattern version I (B), a hybrid pattern (optimized) version II (C) and a radial hybrid pattern (D). It should be noted that for the configuration A uniform illumination has not been not possible to achieve.

As already described with reference to FIG. 3, FIG. 8 shows the light passage area 13 also referred to as the "window" established by the cavity pattern parameters (such as dimension, period, and the like).

Figure 9:
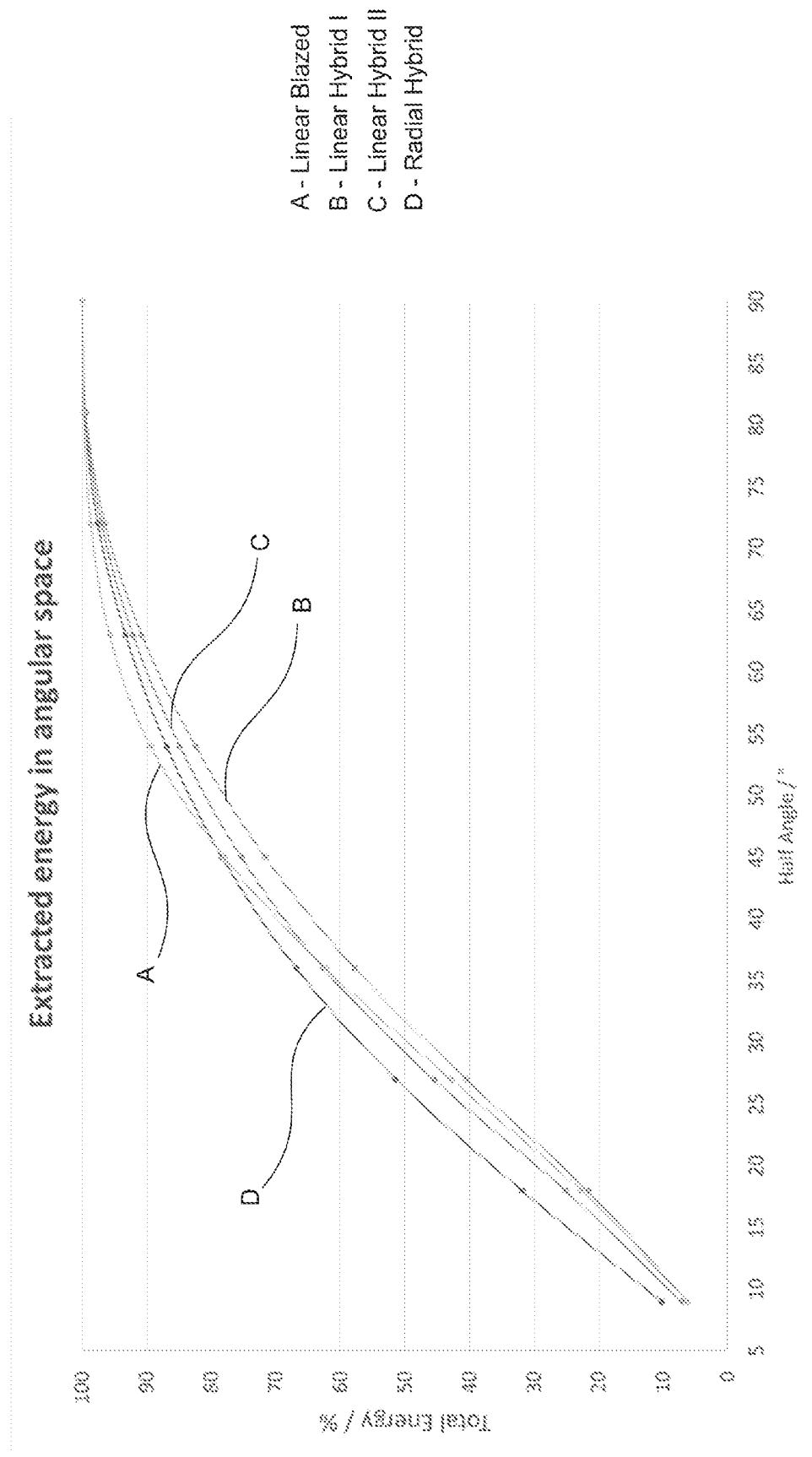

FIG. 9 is a graph showing an amount of extracted energy in angular space for the configurations A, B, C and D according to FIG. 8.

Figure 10:
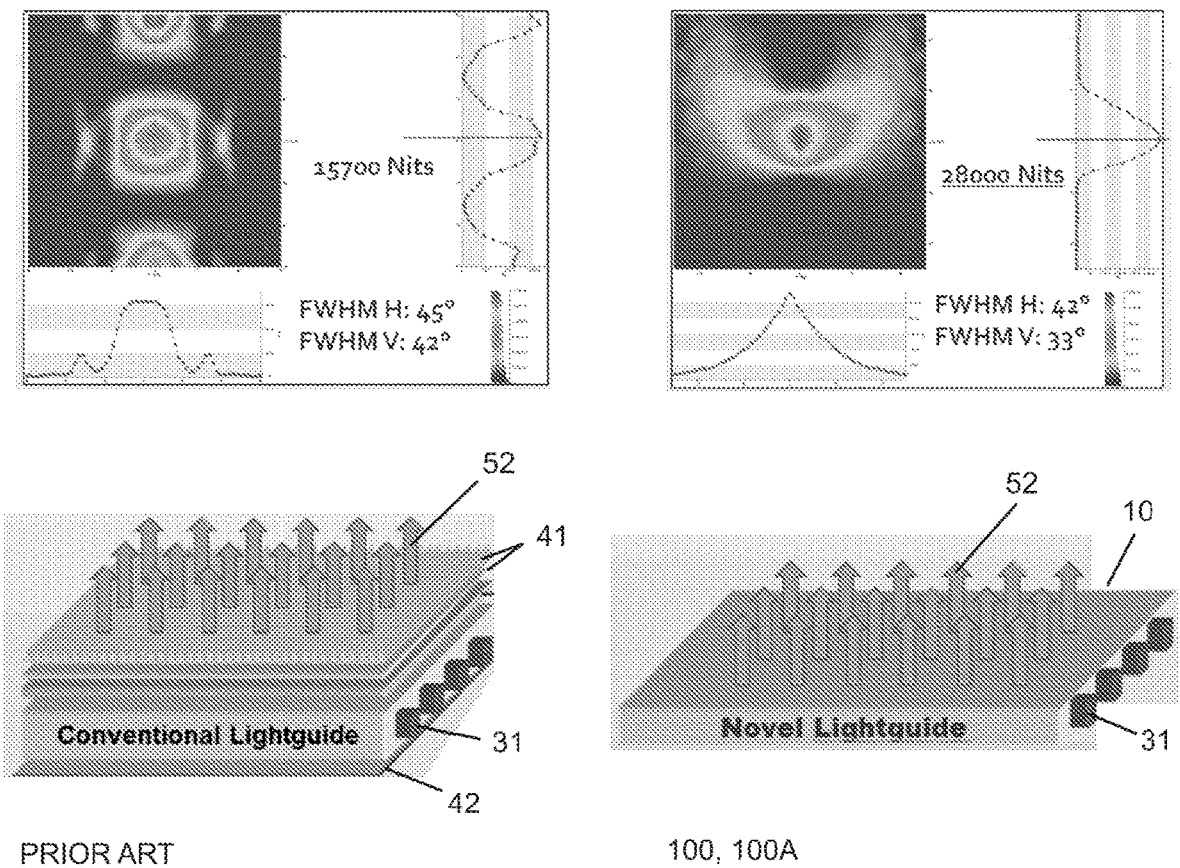
FIG. 10 shows comparison data between a conventional lightguide comprising a number of BEFs and a light distribution element, such as a lightguide, comprising the light distribution structure 10.

FIGS. 8 and 10 further describe the two-dimensional control performance over the outcoupled light distribution by a number of feature patterns. As one may observe from the luminance distribution charts, the highest peak brightness (case D—Radial Hybrid, 28,000 Nits) is over 10,000 Nits higher than conventional xBEF solution producing a peak brightness of 15,700 Nits (FIG. 10, left).

The conventional solution shown on FIG. 10 (left) includes a cross BEF element (defined as a stack of at least two bright enhancement films, BEFs), whereas the light-guide solution implemented according to some aspect of the present invention, comprises the structure 10 with the radial hybrid pattern implemented as D, FIG. 7. Peak brightness for the conventional solution constitutes 15,700 Nits, whereas the same for the solution comprising the structure 10 constitutes 28,000 Nits. Hence, the peak brightness is improved by 178 percent (%).

Figure 11A:
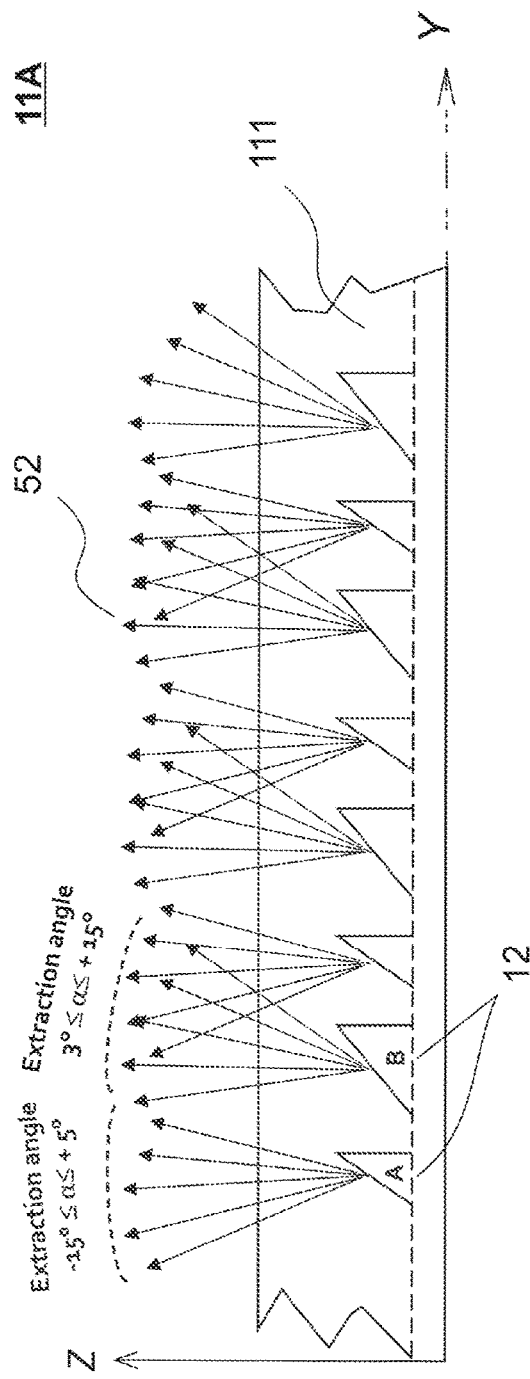
FIGS. 11A and 11B are cross-sectional views of the optical feature patterns, according to various embodiments.

In some embodiments, the optical feature pattern 11 can be configured to comprise cavities with variable configuration (FIG. 11A, features A, B) in terms of at least dimensions, periodicity, orientation, etc. FIG. 11A further shows the effect imposed by the configuration of the cavity (A, B) on the extracted light angular distribution.

Figure 11B:
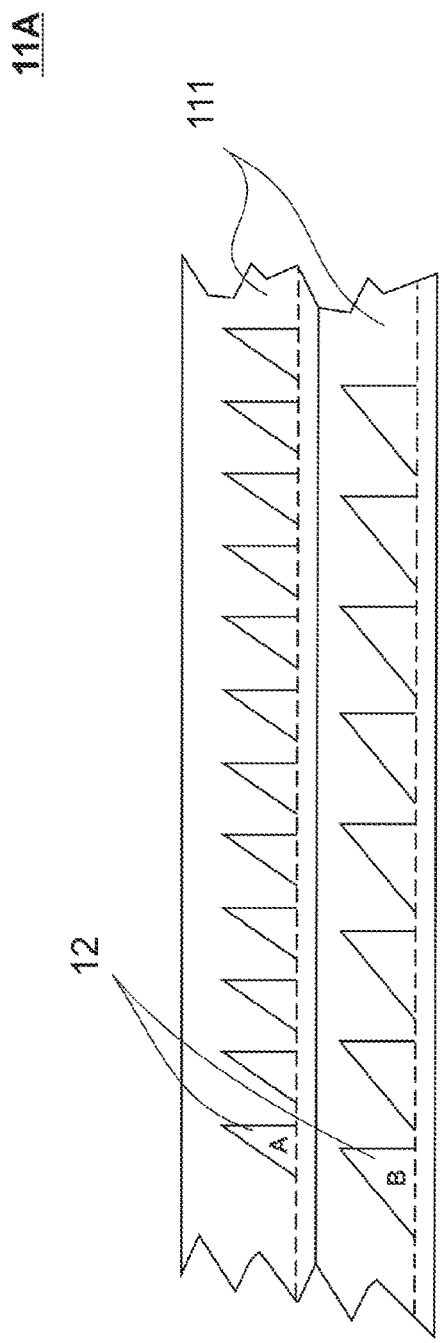

The light distribution structure 10 can be further configured to comprises least two optically functional layers stacked together (FIG. 11B), comprising an at least one optical feature pattern 11, 11A established within the light-transmitting carrier medium 111. Each said feature pattern 11, 11A can thus comprise cavities of different type (A, B). For example, pattern 11 (top) can comprise cavities 12 of A-type, whereas pattern 11A (bottom) can comprise cavities of B-type, or vice versa. Additionally or alternatively, cavities of both types A, B (such as shown on FIG. 11A) can comprise within each pattern 11, 11A of FIG. 11B.

The optical feature pattern can be further configured to a number of anti-reflective nano-patterns and/or sub-profiles that improve transparency and minimize Fresnel reflection.

In some additional configurations, the structure 10 can be embodied such, that the optical feature pattern 11 and the cavities 12 are formed at an interface with an (additional) flat, planar carrier layer, selected from a transparent layer, a reflector layer, and/or a coloured layer.

The light distribution structure 10 can be further configured with an optical feature pattern 11 with exposed (not embedded) cavities 12.

In some further embodiments, the light distribution structure can be configured to further comprise a light filter layer 141 (FIGS. 13, 14A-C) formed of a substrate material having a refractive index ($R_i$) lower than the refractive index of the material constituting the optically functional layer. The light filter layer is preferably configured as a film comprising a plurality of apertures arranged within a predetermined location at said light filter layer or extending along and/or across an entire surface of said light filter layer. A stack may be formed, having the optically functional patterned 11, 11A layer above or below said light filter layer 141.

In another aspect, a method for manufacturing a light distribution structure 10 in the form of an optically functional layer comprising an at least one feature pattern 11, 11A established in a light-transmitting carrier by a plurality of three-dimensional optical features variable in terms of at least one of the cross-sectional profile, dimensions, periodicity, orientation and disposition thereof within the feature pattern, is provided, which method comprises:

a. manufacturing a patterned master tool for said three-dimensional feature pattern 11, 11A) by a piezoelectric cutting method selected from a fast tool servo (FTS) method and a stylus engraving method, or by a laser engraving method, and b. transferring the three-dimensional feature pattern 11, 11A onto the light-transmitting carrier.

For the 3D feature pattern profiles with variable parameters, fabrication of the master tool is very challenging (stands for both planar- and cylinder/drum formats). Other critical issues include high process cost and limitations in large area patterns' fabrication. Typical 3D fabrication methods are thus based on lithography processes, such as mask or mask less exposure, direct laser writing, etc. For these reasons, industrial-scale manufacturing and/or volume manufacturing of 3D optical patterns with variable features has been previously constrained. Present invention overcomes these issues and allows for fabricating single-layer 3D pattern profiles for light extraction, said profiles comprising variable features, such as sinusoidal waveforms with varying height, for example. It is hereby preferred, that the step of manufacturing the patterned master tool comprises provision of the three-dimensional feature pattern configured as symmetrical or asymmetrical sinusoidal waveforms or segmental curvature forms with continuous or discrete profiles.

The three-dimensional feature pattern profile for the light distribution structure 10, in accordance to the present disclosure, can be fabricated on a planar or cylinder master tool by special micromachining technology. Fabrication advantageously involves the most advanced piezoelectric cutting methods, such as fast tool servo (FTS) or stylus cutting/engraving, or, alternatively, the methods of advanced laser engraving with a surface polishing treatment. By these methods, optical structures can be fabricated for large surface areas, e.g. for those having more than 1.5 meters in width. Other, than width, directions depend on a tool format, i.e. flat or cylinder. Circumference of the cylinder tool can vary within a range of 150 mm-about 2000 mm, depending on a (manufacturing) device and a production method selected.

The abovementioned methods have somewhat different criteria for pattern fabrications, in comparison to what is utilized in conventional manufacturing. The basic surface angle and infeed and outfeed angles depend on the master tool shape and speed; however, length and depth depend on stroke and frequency of a piezo-driven servo. Typically, a tool of up to 20 kHz tool can be utilized, in an event if the pattern profiles do not need to be in the same phase. Depth is typically less than 20 micrometers.

For film manufacturing, the cylinder format master tool is preferred, especially, bearing in mind roll-to-roll imprinting or embossing in order produce large quantities of extraction pattern structure.

In still further aspect, a light distribution element 100 (FIGS. 12, 13) is provided comprising an optically transparent substrate 101 configured to establish a path for light propagation therealong, and an at least one light distribution structure 10, according to some previous aspect. Said optically transparent substrate or the medium 101 configured for light propagation is conventionally referred to a "lightguide".

Figure 14:
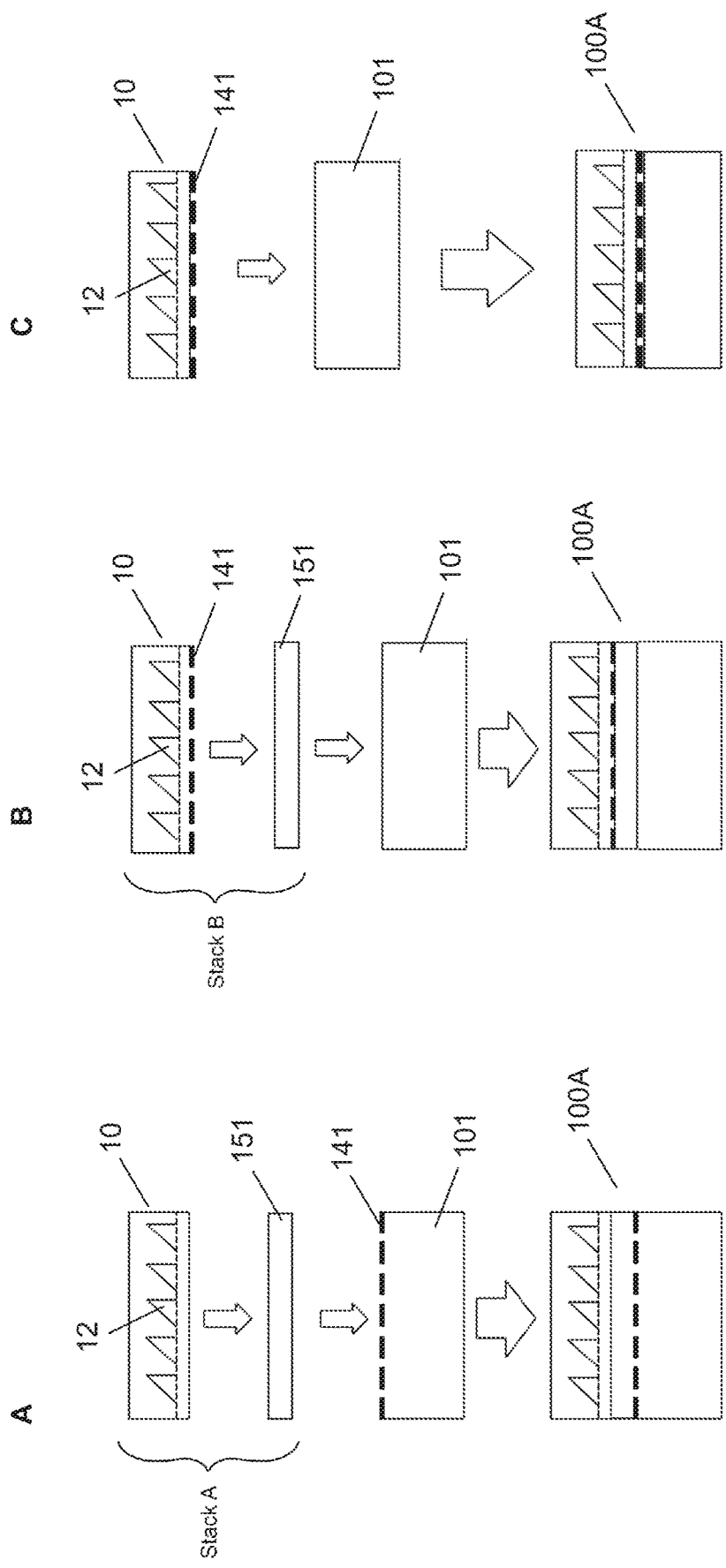
FIGS. 14A-14C and 15 schematically illustrate a manufacturing process of the light distribution elements 100, 100A according to some embodiments.
Figure 15:
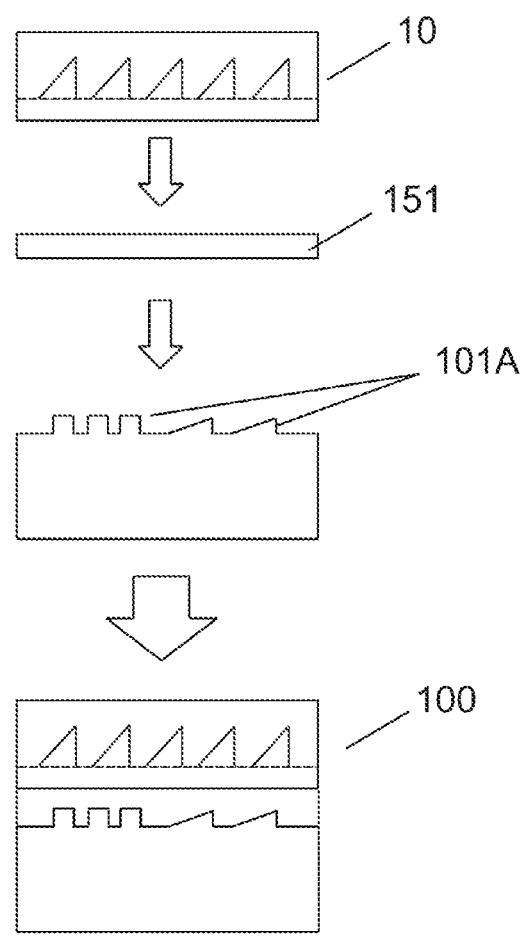

In some configurations, the medium 101 is embodied as a flat layer or a film (FIG. 14). In some other configurations, the lightguide medium can be provided with an at least one optical pattern established at said medium (101A, FIG. 15).

In some embodiments, the light distribution element embodied at 100A further comprises the light filter layer 141 (FIGS. 13, 14A-C). As mentioned hereinabove, the light filter layer 141 is formed of a substrate material that has the refractive index ($R_i$) lower than the refractive index of the material constituting the optically functional patterned 11, 11A layer. The light filter layer 141 is preferably configured as a film comprising a plurality of apertures arranged within a predetermined location at said light filter layer or extending along and/or across an entire surface of said light filter layer.

The light distribution element 100, 100A is preferably configured as a light guide, a light pipe, a light-guide film or a light-guide plate.

In some embodiments, the light distribution element 100, 100A comprises the light distribution structure 10 in the form of an additional layer, such as a film, a sheet or a coating, disposed onto an at least one surface of said waveguide element. In such an event the patterned layer 10 can be laminated on the lightguide 100, 100A, optionally by means of adhesive 151. The adhesive 151 is preferably an optically clear adhesive (OCA) or a liquid optically clear adhesive (LOCA).

In some other embodiments, the light distribution element 100, 100A comprises the light distribution structure 10 fully integrated and/or embedded thereinto.

The light distribution element 100, 100A may further comprise a light source 31, selected from: a Light Emitting Diode (LED), an Organic Light Emitting Diode (OLED), a laser diode, a LED bar, an OLED strip, a microchip LED strip, and a cold cathode tube.

The light filter layer 141 is preferably configured as a thin film with a layer (film) thickness ($h>\lambda$) within a range of 0.2-50 micrometers (μm). In some particular embodiments, layer thickness can vary within a range of 0.2-50 micrometers (μm), preferably, within a range of 0.2-10 um.

The light filter layer 141 is composed of the substrate material provided as a so called low refractive index material and having the refractive index within a range of 1.10-1.41. In any event the refractive index of the light filter layer is provided below 1.5; preferably, below 1.4.

In some configurations, the light filter layer contains nano-silica material in a mesoporous film. In such an event, the low $R_i$ cladding interphase is coated, laminated or bonded with a low-(out)gassing material in order to sustain an index value.

In some preferred embodiments, the light filter layer 141 is configured as a total internal reflection layer structure. The filter layer 141 can thus be implemented as a reflective TIR solution, based on available TIR materials, such as $TiO_2$, $BaSO_4$, $SiO_2$, $Al_2O_2$, Al, Ag, dielectric materials and high reflection (HR)-coating materials.

Figure 16:
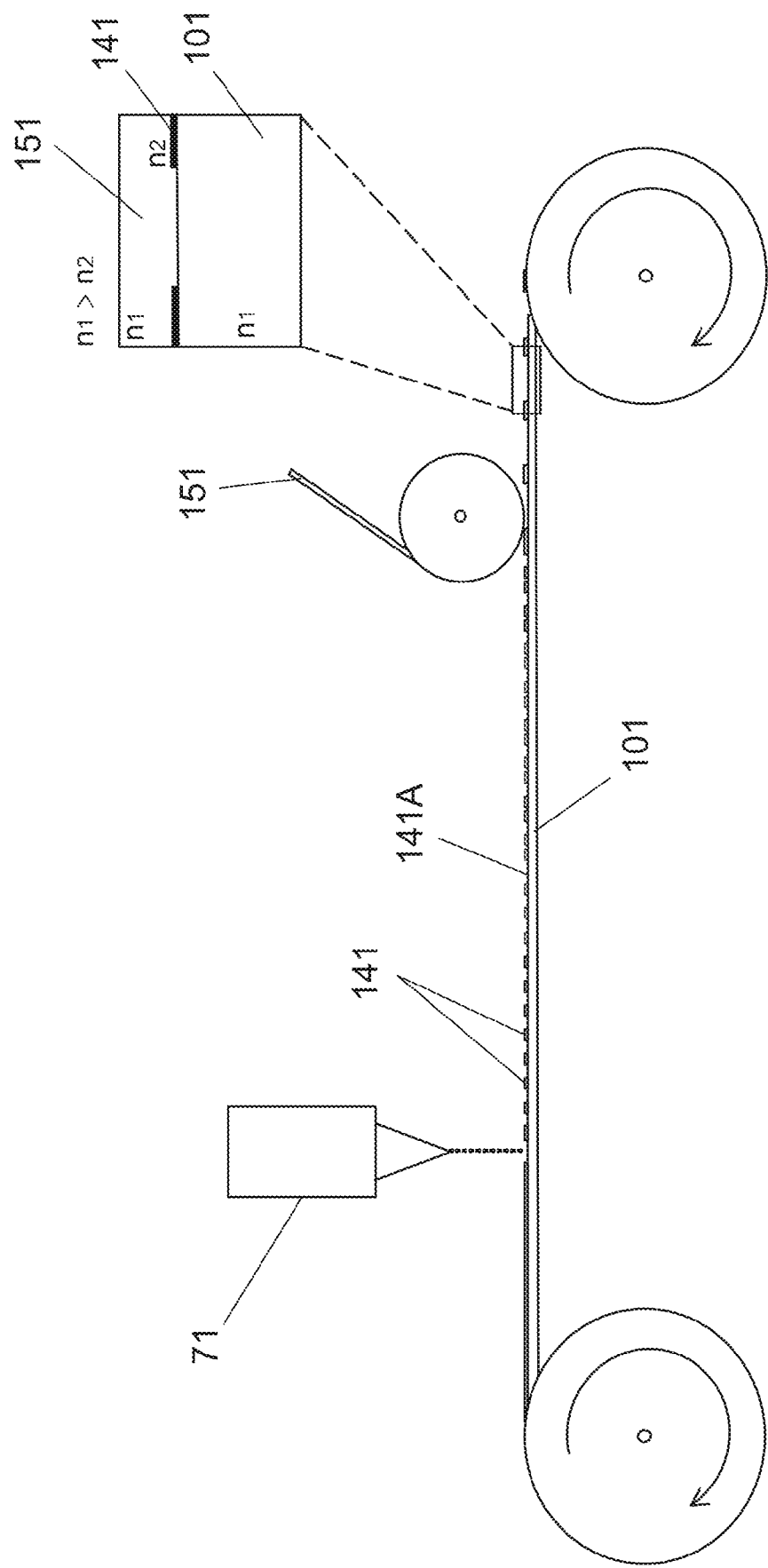
FIGS. 16 and 17 illustrate production processes for a light filter layer (aperture layer) by laser-assisted methods, in accordance to various embodiments.

In some preferred embodiments, the light filter layer 141 is formed of a substrate material (second medium, n2, FIG. 16) having the refractive index ($R_i$) lower than the refractive index of the material constituting the optically functional layer and/or the optically transparent (lightguide) substrate 101 (first medium, n1, FIG. 16), whereby n1>n2 (FIG. 16). Relationship between the refractive index ($R_i$) value of the light filter layer and the lightguide-related parameters, such as an average brightness (Nits) and extraction efficiency (%) is shown in Table 2 below. The expression "low $R_i$ layer" refers to the light filter layer 141.

TABLE 2

Relationship between the refractive index ($R_i$) value of the light filtering layer and lightguide-related parameters.

| RI value of low Ri layer | Average brightness/Nits | Extraction efficiency, out/in/% |
|---|---|---|
| 1.15 | 10950 | 85.2 |
| 1.20 | 10700 | 84.9 |
| 1.38 | 6900 | 71.9 |
| 1.41 | 5840 | 65.6 |

The optical apertures are configured adjustable in terms of dimensions, size and/or shape thereof. In some configurations, the apertures can be essentially circular or rectangular, with the size in either format provided in a range of 0.5-50 um, preferably, within a range of 1-30 um. For the essentially rectangular aperture structures, the aforesaid range is indicative of any one of the length and/or width parameters. For the essentially circular aperture structures, the aforesaid range is indicative of an individual aperture diameter. The depth parameter is defined by the thickness of the light filter layer 141 and it is provided within the range of 0.2-50 um, as defined hereinabove.

Nevertheless, the apertures can be provided as continuous structures, extending over larger areas (in comparison to mentioned above), and having any arbitrary shape. Aperture density and/or the fill factor (per a surface area unit) can be constant (within a range of 0.1%-100%).

It is preferred, that the apertures are established in the light filter layer 141 in a predetermined manner. Thus, in some configurations, provision of apertures is uniform (with constant size, shape and periodicity) along an entire length of a light distribution element, such as a lightguide, i.e. from a light source (e.g. LED) end to the opposite end. In alternative configurations, the apertures can be provided variable in terms of at least size, shape or periodicity from the LED end to the opposite end. Thus, the apertures can be arranged with a variable density utilizing gradual fill factor. In particular, the light distribution element can be configured to include the light filter layer 141 with the apertures, whose size gradually increases from said LED end to the opposite side.

While the optically functional layer with the pattern 11, 11A is primarily configured to propagate and (out)couple light incident thereto, the light filter layer is configured to selectively control and filter light incident thereto and/or propagating via the lightguide However, in terms of dimensions, size and/or shape thereof, functionality of the light filter layer 141 can be modified. Thus, the apertures can be further configured, individually or collectively, to perform a variety of functions, such as light transmission, scattering, refraction, reflection, and the like. In particular, the aperture(s) can be configured to provide the light outcoupling function.

The optical filter can further include apertures with varying optical functionalities, including, but not limited to optical refractive index, non-reflective material, higher optical density, different optical contrast, etc., which provide for light transmitting therethrough and form as a light channel, and have light- and wave-controlling and/or filtering properties to achieve a predetermined light-/signal figure, distribution and efficiency for illumination purposes.

The apertures in the light filter layer can be further filled with a fill material having the refractive index same or higher, as compared to the refractive index of the material the optically transparent (lightguide) substrate 101 is made from.

FIGS. 14A, 14B and 14C show exemplary lightguide structures 100A comprising a light distribution structure 10 laminated together with the light filter layer 141 on a surface of the lightguide medium 101. The optical pattern layer structure 10, optionally comprising the light filter layer 141 (compare FIGS. 14A, 14B) is thus laminated onto the lightguide medium 101, which may also comprise (FIG. 14A) the light filter layer 141 pre-applied thereto. Alternatively, the light distribution structure 10 comprising the optical pattern layer can be coated with said low $R_i$ material, followed by laminating the resulted layered structure with the adhesive (OCA, LOCA, and the like).

Figure 13:
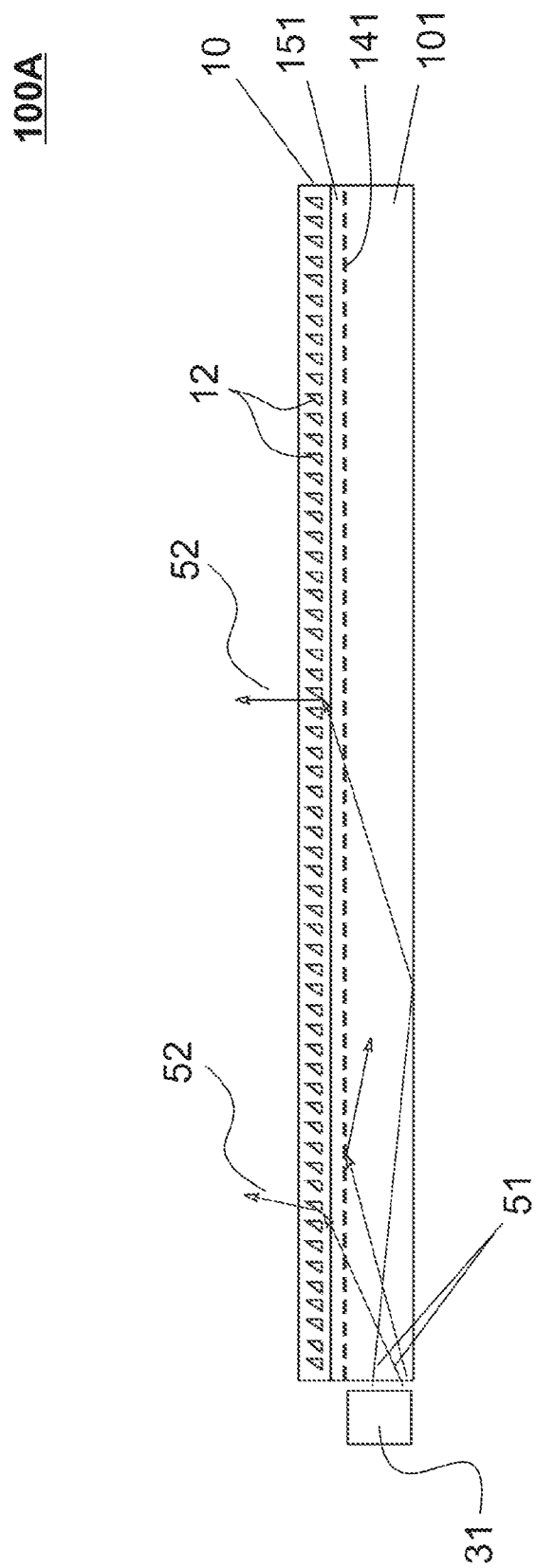
FIG. 13 is a cross-sectional view of a light distribution element 100A according to some embodiment.

In some embodiments it is preferred that the light filter layer 141 is disposed between the optically functional layer (with the pattern 11) and an optically transparent substrate 101 (a lightguide substrate), such as shown on FIGS. 13, 14A, 14B. The stack 100, 100A can be fabricated with the adhesive (FIGS. 14A, 14B) or without the adhesive (FIG. 14C). The light filter layer 141 disposed between the patterned 11 optically functional layer and the lightguide substrate accounts to enhanced uniformity of light passing therethrough. Enhanced uniformity is achieved by the low refractive index of the material the light filter layer is made of and provision of apertures thereon.

In preferred configurations, the apertures provided in the light filter layer 141 are through-apertures that extend through an entire width thereof, as from the optically functional layer to the optically transparent (lightguide) substrate 101.

Hence, the optically functional, patterned 11 layer can be laminated on the light filter (aperture) layer 141 after aperture fabrication, whereby optical interconnection is established between the optically functional layer and the lightguide substrate 101 via said apertures (FIGS. 13, 14A-14C).

The light filter layer 141 is advantageously disposed on an at least one surface of the optically transparent (lightguide) substrate 101. In some instances, the light filter layer 141 is disposed on both surfaces of said lightguide substrate (not shown). It is further preferred that the light filter layer is formed of a material having a refractive index lower than the refractive index of the material constituting the lightguide substrate 101.

Certain amount of propagated light is released out of the lightguide substrate 101 through the optical apertures in the light filter layer (having low $R_i$ value) and is further directed to a next layer, which has relatively the same or higher $R_i$ value than that of the lightguide substrate 101, or at least higher $R_i$ value than the light filter layer (aperture layer). The preferably thin light filter layer 141 with apertures (having thickness of e.g. 0.2-5.0 um), can be directly bonded on the optically transparent (lightguide) substrate and/or on the optically functional layer (with the pattern 11). Alternatively, the light filter layer 141 can be laminated onto any one of the above mentioned layers using adhesive sub-layer(s) (FIGS. 14A, 14B).

In the same manner, as described hereinabove for the optically functional patterned 11 layer, the light filter layer 141 can be provided a separate layer or as a layer integrated into the lightguide substrate 101.

The light filter layer 141 can thus be configured as a transparent, low refractive index filter layer or as reflective TIR layer (e.g. diffusive or specular TIR layer) formed on the at least one side of the optically transparent (lightguide) substrate 101 or at or both sides thereof (top and bottom surfaces). Said optical filter can be: a) applied directly on a flat surface, b) laminated by an adhesive layer, or c) bonded by chemical surface treatment such as VUV (vacuum UV), atmospheric plasma treatment or microwave assisted bonding.

In some instances, the light filter layer 141 has gradually variable low $R_i$ values to provide preferred light distribution even in an absence of apertures.

The apertures within the light filter layer 141 can be optically modulated, whereby a variety of light distribution patterns produced by the light filter layer can be attained, including, but not limited to: uniform, symmetric, discrete, or asymmetric light distribution patterns.

The light filter layer 141 optical filter layer including optical apertures is thus provided on an at least one side of the lightguide medium.

Light distribution by the optical apertures forming a predetermined figure (an image) or a signal, for example, such as on a display, a signage or a poster, can be uniform, non-uniform or discrete. Thereby, uniform, non-uniform or discrete figure (image) or signal can be formed. Apertures can be provided on both sides of the optical filter layer forming uniform/continuous or discrete areas. The apertures can be provided throughout the entire surface of the optical filter layer or at predetermined areas thereof. The principal function of apertures is to control the amount of incident light propagating from the first medium to the second medium without light out-coupling, meaning all incident light angle is larger or the same as the critical angle in the medium. Especially, light uniformity control can thus be achieved without optical pattern.

Optical apertures have a number of primary functions, such as transmitting light therethrough from the first medium to the second medium, which determines desired light distribution and/or uniformity. Light distribution in the first and second medium typically has an incident light angle below the critical angle (an angle of incidence above which TIR occurs) with regard to the medium interface, when air or low Ri filter/-cladding are forming the interface. As a result, light is not out-coupled from the medium.

The apertures can be manufactured by means of laser ablation, short pulse system, plasma etching, mask assisted excimer exposure, micro-printing and/or any other suitable method. For example, laser ablation can be performed utilizing roll-to-roll equipment and methods, wherein the production process may speed up to 40 meters per minute.

Optical apertures can be fabricated by a variety of methods, including, but not limited to: laser patterning, direct laser imaging, laser drilling, mask and/or maskless laser or electron beam exposure, modifying optical material/$R_i$ value by applying discrete properties by printing, inkjet printing, screen printing, micro-/nano dispensing, dosing, direct "writing", discrete laser sintering, micro electrical discharge machining (micro EDM), micro machining, micro moulding, -imprinting, -embossing, and the like. Formation of optical apertures can be completed upon a direct contact with the low $R_i$ cladding or a reflective TIR cladding.

Additionally, aperture formation can be completed upon an indirect contact, such as operating through the carrier substrate or a lightguide element (medium), e.g. by means of laser ablation, thereby the cladding is removed by ablation, thus forming a desired aperture feature in terms of size and shape in the same manner as by means of the direct contact method. Laser beam spot profile is preferably shaped as a flat top-hat, which does not produce excessive heat and does not damage the carrier substrate or the lightguide medium element, accordingly. Laser wavelength can be selected in terms of cladding absorption curve, hole edge quality, beam shaper optics, thickness/height, operation costs, and the like.

Figure 17:
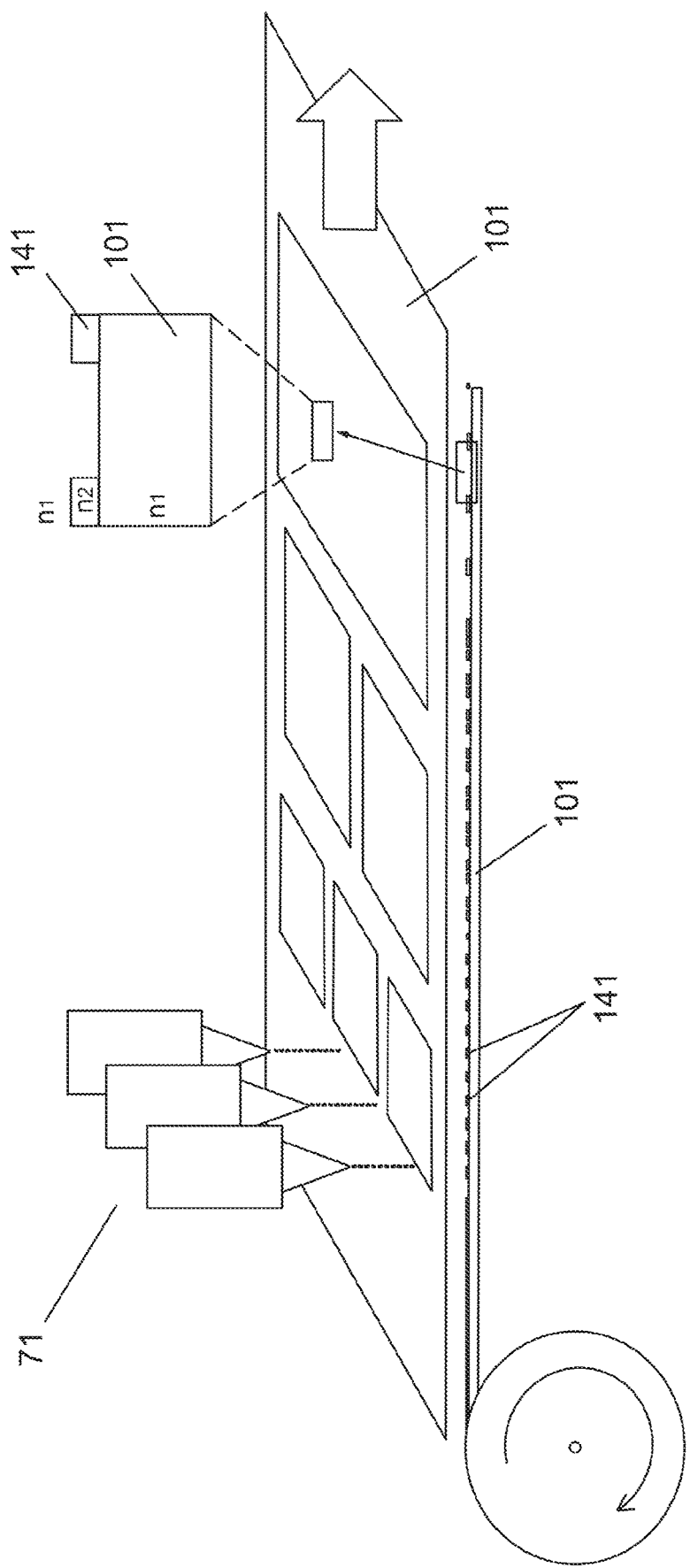
Figure 18:
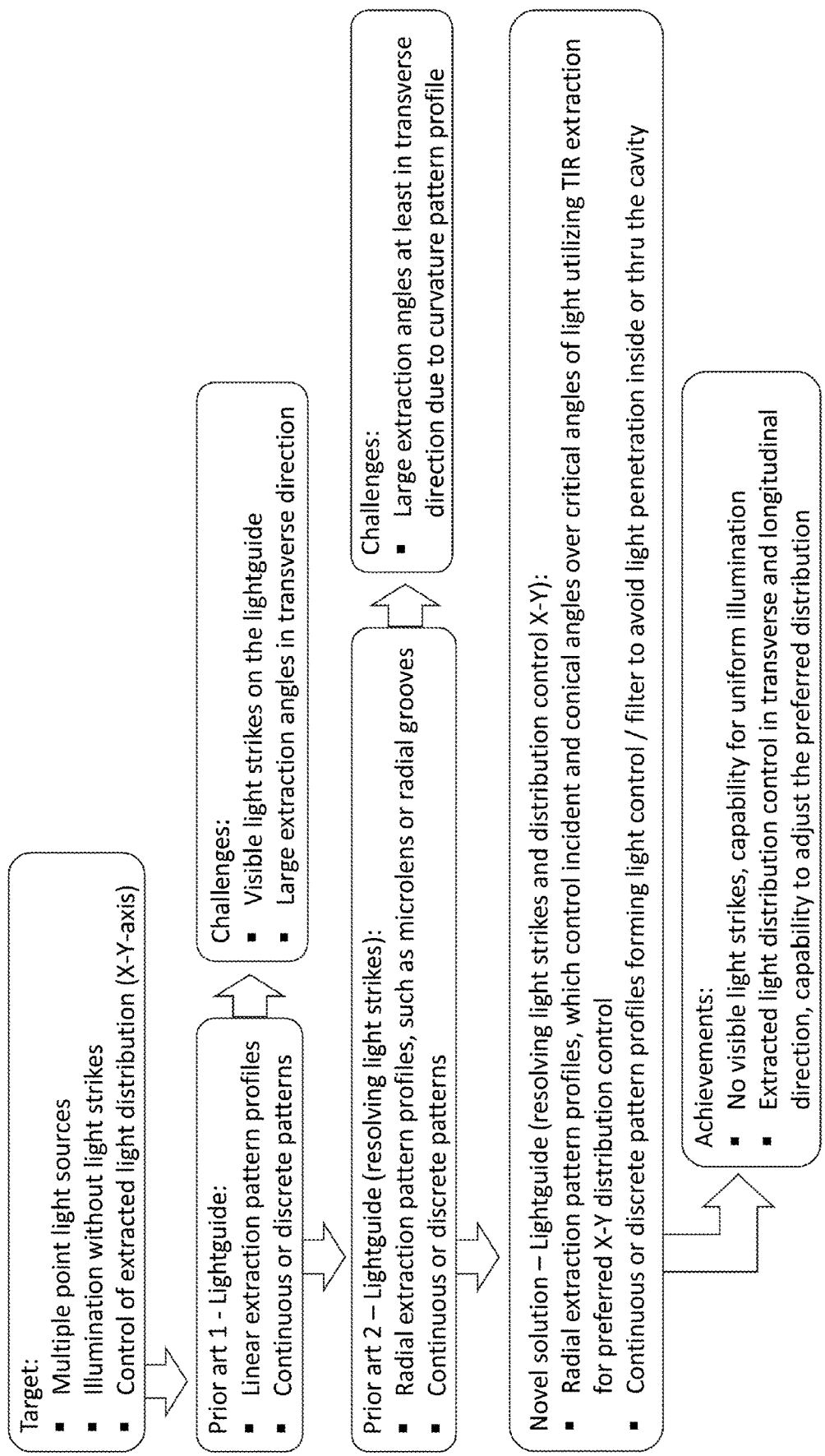
FIG. 18 is a chart describing development of prior art technologies and their comparison to the solution disclosed hereinbelow.

FIGS. 16 and 17 illustrate laser-assisted methods for aperture fabrication. In an exemplary embodiment shown on FIG. 17, a low refractive index coating is ablated/removed by laser at a speed of 1-20 m/min, thereby subsequent aperture features with minimum size of about 5-20 micrometers (μm) are fabricated. The method can be implemented as a continuous or a stop-and-repeat roll-to-roll method or a roll-to-sheet method. The method allows for fabricating a non-continuous film by film- or a sheet-by-sheet method. FIGS. 16 and 17 show fabrication of apertures with gradual or constant fill factors.

Upon utilizing multiple scanning heads, such as shown on FIG. 17, a wide web with the width of up to 1.5 meters can be manufactured.

In some preferred embodiments, the process, such as shown on FIG. 16, further involves provision of the light distribution structure 10 with related pattern(s) 11, 11A comprising cavity optics 12 on the optically transparent substrate 101. The pattern 11, 11A is thus pre-applied onto the substrate 101, whereafter the patterned substrate 101 is further coated by the low Ri film, in which optical apertures are fabricated.

FIG. 17 illustrates an exemplary embodiment for the laser-assisted aperture production with multiple scanners and lasers, thereby a line width 1.0m-1.5 m can be achieved. The method provides for creating uniform lightguide designs of any size by gradual or constant aperture fabrication; therefore, the need in customized 3D-fabrication process for each product is eliminated. Ready films can be further cut to pieces of particular size.

Typically, large lightguides (with the surface area equal or superior to about 0.5-1 m$^2$) are very expensive and challenging in terms of pattern fabrication on an entire surface and/or volume production by moulding, for example. The fabrication concept disclosed above provides for a flexible and a cost-effective solution variety of sizes, especially, those exceeding 0.5 m$^2$. The concept enables utilizing large volume production capacity by means of roll-to-roll, roll-to-sheet or sheet-to-sheet methods. Final production speed depends on selected manufacturing method. Speed can vary between 0.5-30 m/min and it can be continuous or stop-and-repeat. Manufacturing is based on thin film solutions. Apertures are formed on a thin film, which can be further utilized as a lightguide. Alternatively this film can be laminated or bonded directly on the lightguide medium to form one solid lightguide element without any optical patterns. This type of aperture film solution makes the final production flexible and cost-effective. Large quantity of basic cladding- or coating films can be produced and stored in rolls, thereafter apertures can be manufactured with repeating and continuing methods and finally stored in rolls or cut-off for sheets.

In some embodiments, the apertures are produced by means of roll-to-roll manufacturing method, in which the light filter layer is fabricated by short pulse laser, followed by coating thereof by an adhesive or any other cover layer, thereby a thin multi-layer film stack is formed.

Another solution is to apply the light filter layer 141 (low R$_i$ cladding) directly on the basic medium surface and to fabricate the apertures, followed by application of the film with optical patterns 11, 11A on the top of said optical filter, for the light out-coupling purpose. This solution reduces one lamination or bonding phase. Both solutions can be applied on single or dual side of the lightguide surface.

In terms of the structural features, a front surface and a rear surface can further be distinguished within the light distribution element 100, 100A, wherein the refractive index of the material constituting said front surface differs from the refractive index of the material constituting said rear surface, wherein a boundary interface is further formed between the light filter layer 141 and the optically functional, patterned 11 layer, and wherein the optical function of the light distribution element is based on and controlled by total internal reflection and absorption of light.

According to some configurations, the lightguide element 100A is thus implemented with the optical filter apertured layer 141 and the optical feature pattern 11, 11A that provides, inter alia, for light outcoupling and extraction. Such lightguide element comprises the optically transparent substrate or medium 101 (See FIG. 14) for incoupled light propagation, the optical filter solution(s) and optically functional layer(s) for light outcoupling and distribution control.

Additionally, all above solutions can be constructed with thin cladding having the same R$_i$ value than the first medium and the second medium, which is forming apertures between mediums by removing cladding around the apertures.

In a further aspect, use of the light distribution element 100, 100A is provided in illumination, in indication and in signal solutions. In particular, use of the element 100, 100A is provided in illumination of wall- and roof panels, in window and façade illumination, in signage illumination, in greenhouse illumination, in display illumination, in transparent display illumination, in passive matrix illumination, in signal illumination, in touch signal solutions, in security systems, in producing light-directing films, in creating light masks for a non-transparent mode, in security systems, in indicator devices, in reflectors, and/or in light collector solutions.

The light distribution element 100, 100A can be configured as a frontlight illumination device or a backlight illumination device.

In still further aspect, a roll of a light distribution element 100, 100A is provided comprising: (a) an optically functional layer comprising an at least one feature pattern 11, 11A established in a light-transmitting carrier by a plurality of three-dimensional optical features variable in terms of at least one of the cross-sectional profile, dimensions, periodicity, orientation and disposition thereof within the feature pattern, and (b) a light filter layer 141 formed of a substrate material having a refractive index than the refractive index lower that the refractive index of the carrier medium constituting the optically functional layer, and comprising a plurality of apertures.

Provision of the roll is illustrated by FIGS. 16 and 17.

In some embodiments, the roll of the light distribution element 100, 100A comprises the optically functional layer established by the light distribution structure 10, according to the embodiments described hereinabove.

In some embodiments, the roll further comprises an optically transparent substrate 101 configured to establish a path for light propagation along said substrate.

The present invention is further defined in any of the following numbered paragraphs:

1. A controlled light distribution element comprising:
   an integrated internal light filtering layer arranged on an at least one sur-face of said light distribution element and/or
   an optically functional layer comprising an at least one optical pattern, preferably with a light outcoupling function,
   wherein said optically functional layer is fully integrated and/or embedded within the light distribution element, and wherein the light filtering layer is formed of a substrate material having a refractive index lower than the refractive index of the material constituting the optically functional layer.

2. The light distribution element of paragraph 1, wherein the light filtering layer comprises a plurality of apertures arranged within a predetermined location at said light filtering layer or extending along and/or across an entire surface of said light filtering layer.

3. The light distribution element of paragraphs 1 or 2, configured as a lightguide or a light pipe-type component, said element further comprises a light-transmissive substrate.

4. The light distribution element of any one of paragraphs 1-3, wherein the light filtering layer is disposed between the light-transmissive substrate and the optically functional layer.

5. The light distribution element of any one of paragraphs 1-3, wherein the apertures comprised in the light filtering layer are through-apertures that extend through an entire width of the light filtering layer, as from the optically functional layer to the light-transmissive substrate.

6. The light distribution element of any preceding paragraph, further comprising a light source, selected from a Light Emitting Diode (LED), a laser, or any other light source.

7. The light distribution element of any preceding paragraph, further comprising a front surface and a rear surface, wherein the refractive index of the material constituting said front surface is different from the refractive index of the material constituting said rear surface, wherein a boundary interface is further formed between said light filtering layer and said optically functional layer, and wherein the optical function of the light distribution element is based on and controlled by total internal reflection and absorption of light.

8. The light distribution element of any preceding paragraphs 2-7, wherein the apertures arranged within the light filtering layer are filled with a fill material having the refractive index same or higher, as compared to the refractive index of the material the light-transmissive substrate is made from.

9. The light distribution element of any preceding paragraphs 2-8, where the apertures arranged within the light filtering layer are produced by means of laser ablation, short pulse system, plasma etching, mask assisted excimer exposure, and micro-printing.

10. The light distribution element of any preceding paragraphs 2-9, wherein the apertures are produced by means of roll-to-roll manufacturing method, in which the light filtering layer is fabricated by short pulse laser, followed by coating thereof by an adhesive or any other cover layer, thereby a thin multi-layer film stack is formed.

11. The light distribution element of any preceding paragraphs 2-10, wherein the apertures are optically modulated to produce uniform, symmetric, discrete or asymmetric light distribution by the light filtering layer.

12. The light distribution element of any preceding paragraph, wherein the at least one optical pattern provided within the optically functional layer is a symmetric, unmodulated optical pattern configured to perform a number of optical functions, in which the preferred light outcoupling function is arranged outside the element providing the preferred light distribution.

13. The light distribution element of any preceding paragraph, wherein the at least one optical pattern provided within the optically functional layer is asymmetric, pre-modulated optical pattern configured to perform a number of optical functions, in which the preferred light distribution function is supported by said pre-modulated pattern or patterns.

14. The light distribution element of any preceding paragraph, wherein the at least one optical pattern provided within the optically functional layer is a relief pattern comprising a plurality of relief forms therewithin, and wherein the optical function or functions of said optically functional layer is/are established by said optical pattern parameters, such as dimensions, shape and periodicity of relief forms provided within said relief pattern.

15. The light distribution element of any preceding paragraph, wherein the optically functional layer has an optical pattern fill factor equal to 100% or less than 100%, thereupon haziness and transparency can be controlled.

16. The light distribution element of any preceding paragraph, wherein the at least one optical pattern provided within the optically functional layer comprises pattern features of the at least one type or different types, thereupon different light distribution can be achieved.

17. The light distribution element of any preceding paragraph, wherein the at least one optical pattern provided within the optically functional layer is established by relief forms selected from the group consisting of: a groove, a recess, a dot, a pixel, an asymmetric pixel, and the like, wherein said relief forms have crosswise con-cave or convex profiles selected from: binary, blazed, slanted, prism, hemispherical, and the like, and wherein said relief forms have lengthwise shape selected from: linear, curved, waved, sinusoid, and the like.

18. The light distribution element of any preceding paragraph, wherein the optical patterns pro-vided within the optically functional layer are based on distinct, individual fea-tures, periodical features, grating features, and pixel features.

19. The light distribution element of any preceding paragraph, wherein the optical patterns are formed within the optically functional layer by air-cavity optics configured as a plurality of optical forms and cavities embedded at an interface with a laminated transparent layer, laminated reflector layer, and/or a laminated coloured layer.

20. The light distribution element of any preceding paragraph, further comprising an at least one internal light refracting convex pattern for directing light to the optically functional layer for light outcoupling, in which pattern a substrate is adhered or bonded to the optically functional layer by the optically transparent material having low refractive index, or the substrate is coated with said low refractive index material prior to bonding or adhering onto the optically functional layer 21. A controlled light distribution element of any preceding paragraph, comprising an integrated internal light filtering layer formed of substrate material provided as a low refractive index material, wherein said light filtering layer optionally comprises a plurality of apertures arranged into an array extending along and/or across an entire surface of said light filtering layer.

22. A light distribution element, comprising:
a lightguide medium configured for light propagation, and
an optical filter layer disposed on an at least one surface of the lightguide medium and provided with an at least one optical function through an entire surface coverage or at predetermined areas thereof,
wherein the at least one optical function of said optical filter layer, in terms of at least the material it is formed of, is selected from: reflection, transmission, polarization, and refraction.

23. The light distribution element of paragraph 22, wherein said optical filter layer is formed of a material having a refractive index lower than the refractive index of the material constituting the lightguide medium.

24. The light distribution element of any one of paragraph 22 or 23, wherein the optical filter layer is a cladding, a coating, or a film.

25. The light distribution element of any preceding paragraphs 22-24, wherein the optical filter is configured as a reflective Total Internal Reflection layer structure.

26. The light distribution element of any preceding paragraphs 22-25, wherein the optical filter layer is disposed on both surfaces of the lightguide medium.

27. The light distribution element of paragraph 26, wherein the optical filter layers disposed on each surface of the lightguide medium have different refractive index values.

28. The light distribution element of paragraph 26, wherein the optical filter layers disposed on an upper surface and on a lower surface of the lightguide medium have refractive index (Ri) values 1.10 and 1.25, accordingly.

29. The light distribution element of any preceding paragraphs 22-28, wherein the at least one optical filter layer comprises a plurality of apertures arranged into an at least one array within an at least one predetermined location at the light distribution filter layer, or into an at least one array extending along and/or across an entire surface of the light distribution filter layer.

30. The light distribution element of paragraph 29, wherein the apertures in the optical filter layer are through-apertures.

31. The light distribution element of any one of paragraphs 29 or 30, wherein the apertures are produced by an at least one method selected from the group consisting of: laser patterning, direct laser imaging, laser drilling, mask- and mask-less laser or electron beam exposure, printing, machining, moulding, imprinting, embossing, micro- and nano-dispensing, dosing, direct writing, discrete laser sintering, and micro-electrical discharge machining (micro EDM).

32. The light distribution element of any preceding paragraphs 22-31, wherein a boundary interface is formed between the lightguide medium and the optical filter layer, thereby a light distribution function of the light distribution element is based on and controlled by total internal reflection and absorption of light.

33. The light distribution element of any preceding paragraphs 22-32, further comprising an optically functional layer comprising an at least one optically functional pattern with an at least a light outcoupling function 34. The light distribution element of paragraph 33, wherein the at least one optically functional pattern is a relief pattern comprising therewithin a plurality of relief forms configured as prominent profiles alternating with corresponding cavities, wherein an optical function or functions of said optically functional layer is/are established by an at least one of the: dimensions, shape, periodicity and disposition of the profiles provided within said optically functional pattern.

35. The light distribution element of the paragraph 34, wherein the cavities are filled with air.

36. The light distribution element of any preceding paragraphs 33-35, wherein the optically functional pattern is a hybrid pattern comprising a plurality of discrete profiles or a plurality of at least partly continuous profiles.

37. The light distribution element of any preceding paragraphs 33-36, wherein the at least one optical pattern provided within the optically functional layer is established by the relief forms selected from the group consisting of: a groove, a recess, a dot, and a pixel, wherein said relief forms have crosswise concave or convex profiles selected from: binary, blazed, slanted, prism, trapezoid, hemispherical, and the like, and wherein said relief forms have lengthwise shape selected from: linear, curved, waved, sinusoid, and the like.

38. The light distribution element of any preceding paragraph 22-37, wherein the at least one optically functional pattern is fully integrated and/or embedded within the lightguide medium.

39. The light distribution element of any preceding paragraph 22-38, wherein the at least one optically functional pattern is further configured to incouple light incident thereon.

40. The light distribution element of any preceding paragraphs 22-39, further comprising a polarizer disposed on the optically functional layer, thereby the optical pattern provided within said optically functional layer is configured such, as to cooperate, in terms of its optical function or functions, with the polarizer.

41. The light distribution element of any preceding paragraph 22-40, wherein the optical filter layer and/or the optically functional layer is/are produced by roll-to-roll- or roll-to-sheet methods.

42. The light distribution element of any preceding paragraph 22-41, wherein the light-guide medium and the optically functional layer is an optical polymer and/or glass.

43. The light distribution element of any preceding paragraph 22-42, wherein the optical filter layer is disposed between the lightguide medium and the optically functional layer.

44. The light distribution element of any preceding paragraph 22-43, further comprising a light source, selected from: a Light Emitting Diode (LED), an Organic Light Emitting Diode (OLED), a laser diode, a LED bar, an OLED strip, a microchip LED strip, and a cold cathode tube.

45. An optical device comprising the light distribution element according to any one of paragraphs 22-44.

46. The optical device according to paragraph 45, configured as a frontlight illumination device or a backlight illumination device.

47. Use of the optical device as defined in any one of the paragraphs 45 and 46 in illumination and indication, selected from the group consisting: of decorative illumination, light shields and masks, public and general illumination, including window, façade and roof illumination, signage-, signboard-, poster- and/or an advertisement board illumination and indication, and in solar applications.

It is clear to a person skilled in the art that with the advancement of technology the basic ideas of the present invention are intended to cover various modifications thereof. The invention and its embodiments are thus not limited to the examples described above; instead they may generally vary within the scope of the appended claims.

The invention claimed is:

1. A light distribution structure in the form of an optically functional layer, comprising:
at least one three-dimensional feature pattern established in a light-transmitting carrier medium by a plurality of internal optical cavities,
wherein each said optical cavity is configured to establish at least one optical function at its' horizontal surface and at its' inclined surface, the optical cavities being arranged in a direction along an essentially longitudinal light propagation path in the light-transmitting carrier medium, wherein
- by said horizontal surface the optical cavity is configured to mediate light propagation in the light-transmitting carrier medium along the essentially longitudinal light propagation path, and to further distribute light rays reflected from said horizontal surface, in the light-transmitting carrier medium, towards the inclined surface of the subsequent optical cavity of cavities via a plurality of light passage areas, and
- by said inclined surface the optical cavity is configured to extract light out of the structure in a predetermined direction essentially transverse to the longitudinal light propagation path, and
- wherein an edge of the inclined surface of each said optical cavity has a curved shape or a wave-shape when viewed along a normal to the horizontal surface.

2. The light distribution structure of claim 1,
wherein said at least one optical function is the total internal reflection function.

3. The light distribution structure of claim 1,
wherein each optical cavity is configured to receive and to further distribute light arriving thereto at an angle of incidence equal to or greater than the critical angle relative to the surface normal.

4. The light distribution structure of claim 1,
wherein the established optical cavities are filled with a gaseous material, such as air.

5. The light distribution structure of claim 1,
wherein each individual optical cavity is configured variable in terms of at least one of the cross-sectional profile, dimensions, periodicity, orientation and disposition thereof within the feature pattern.

6. The light distribution structure of claim 1,
wherein the edge of the inclined surface of each said optical cavity has a syn metrical sinusoidal waveform or an asymmetrical sinusoidal waveform.

7. The light distribution structure of claim 1,
wherein cross-sectional profile variability, curvature angle variability and/or curvature radius variability is established, for each individual optical cavity, with a predetermined periodicity.

8. The light distribution structure of claim 1,
wherein the at least one feature pattern comprises a plurality of optical cavities with discrete profiles or at least partly continuous profiles.

9. The light distribution structure of claim 1,
wherein cross-sectional variability is established, for each individual optical cavity, in three dimensions by the at least one of the: curvature angle, curvature radius, length of a pitch, width, height, period, phase, configuration of alight passage area, and the like.

10. The light distribution structure of claim 1,
wherein the feature pattern is configured to extend over the entire optically functional layer.

11. The light distribution structure of claim 1, further comprising:
a number of feature patterns arranged on at least one optically functional layer according to a predetermined order.

12. The light distribution structure of claim 1,
wherein, within the at least one feature pattern, the plurality of optical cavities is arranged into an array or arrays extending along and/or across an entire area occupied by said feature pattern.

13. The light distribution structure of claim 1,
wherein the optically functional layer has a fill factor for the feature pattern equal to 100% or less than 100%.

14. The light distribution structure of claim 1, further comprising:
at least two optically functional layers with the at least one feature pattern established on each said layer.

15. The light distribution structure of claim 1, provided in the form of a film, a sheet or a coating.

16. The light distribution structure of claim 1,
wherein the optically functional layer is established in an optical polymer or glass.

17. The light distribution structure of claim 1,
wherein the optical cavities are formed at an interface with an additional flat, planar carrier layer, selected from a transparent layer, a reflector layer, and/or a coloured layer.

18. The light distribution structure of claim 1, configured to receive light from a plurality of point light sources.

19. A light distribution element, comprising:
an optically transparent substrate configured to establish a path for light propagation therealong, and
at least one light distribution structure, as defined in claim 1.

20. The light distribution element of claim 19, further comprising:
the light distribution structure in the form of an additional layer, such as a film, a sheet or a coating, disposed on at least one surface of the optically transparent substrate.

21. The light distribution element of claim 19, further comprising:
the light distribution structure fully integrated and/or embedded into the optically transparent substrate.

22. The light distribution element of claim 19, configured as a light guide, a light pipe, a light-guide film or a light-guide plate.

23. The light distribution element of claim 19, further comprising:
at least one light source, selected from: a Light Emitting Diode (LED), an Organic Light Emitting Diode (OLED), a laser diode, a LED bar, an OLED strip, a microchip LED strip, and a cold cathode tube.

24. Use of the light distribution element as defined in claim 19 in illumination and indication.

25. Use according to claim 24, in illumination of wall- and roof panels, in window and facade illumination, signage illumination, in greenhouse illumination, in display illumination, in passive matrix illumination, in signal illumination, in touch signal solutions, in security systems, in producing light-directing films, in creating light masks for a non-transparent mode, in security systems, in indicator devices, in reflectors, and/or in light collector solutions.

26. A roll of a light distribution element, comprising:
an optically functional layer comprising as least one feature pattern established in a light-transmitting carrier by a plurality of three-dimensional optical features variable in terms of at least one of the cross-sectional profile; dimensions, periodicity, orientation and disposition thereof within the feature pattern, and
a light filter layer formed of a substrate material having a refractive index than the refractive index lower that the refractive index of the carrier medium constituting the optically functional layer, and comprising a plurality of apertures,
in which the optically functional layer is established by the structure, as defined in claim 1.

27. The light distribution structure of claim 1,
wherein each said optical cavity has the horizontal surface, the inclined surface and another surface, and an angle between the horizontal surface and the inclined surface is smaller than an angle between the horizontal surface and the other surface.

28. The light distribution structure of claim 27, wherein the angle between the horizontal surface and the inclined surface is about 50 degrees and the angle between the horizontal surface and the other surface smaller is about 85 degrees.

* * * * *

UNITED STATES PATENT AND TRADEMARK OFFICE
CERTIFICATE OF CORRECTION

PATENT NO. : 11,536,896 B2
APPLICATION NO. : 16/760259
DATED : December 27, 2022
INVENTOR(S) : Rinko It is certified that error appears in the above-identified patent and that said Letters Patent is hereby corrected as shown below:

In the Claims

In Column 27, Line 35 (Claim 6, Line 3), the expression "syn metrical" should read -- symmetrical --.

In Column 27, Line 51 (Claim 9, Line 6), the expression "alight" should read -- a light --.

In Column 28, Line 59 (Claim 26, Line 9), the expression "index than the refractive index lower that" should read -- index lower than --.

Signed and Sealed this
Eleventh Day of July, 2023

Katherine Kelly Vidal
*Director of the United States Patent and Trademark Office*